US007337892B2

(12) United States Patent
Groot et al.

(10) Patent No.: US 7,337,892 B2
(45) Date of Patent: Mar. 4, 2008

(54) DEVICE FOR SORTING PRODUCTS

(75) Inventors: Frits Franciscus Carolus Groot, Boxtel (NL); Gregorius Maria Adrianus Van Vught, Eindhoven (NL); Cornelius Christiaan Goelema, Eindhoven (NL); Simon Stikkelorum, s'-Hertogenbosch (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 11/123,194

(22) Filed: May 6, 2005

(65) Prior Publication Data
US 2005/0274589 A1   Dec. 15, 2005

(30) Foreign Application Priority Data
May 7, 2004   (NL) .................................... 1026137

(51) Int. Cl.
*B65G 47/34* (2006.01)
(52) U.S. Cl. ........................... 198/370.04; 198/370.01; 198/369.3; 198/484.1; 198/803.1; 198/803.13; 209/698
(58) Field of Classification Search ........... 198/370.04, 198/370.01, 369.3, 484.1, 803.1, 803.13; 209/698
See application file for complete search history.

(56) References Cited

U.S. PATENT DOCUMENTS 3,169,631 A    2/1965  Knappe
4,031,998 A *  6/1977  Suzuki et al. .......... 198/370.04
5,667,054 A *  9/1997  van den Goor ........ 198/370.04
6,135,262 A * 10/2000  Polling .................. 198/370.04
6,152,280 A * 11/2000  Bruun ................... 198/370.04
6,607,066 B1 * 8/2003  Andersen et al. ...... 198/370.04

FOREIGN PATENT DOCUMENTS

EP    0 869 086 A2   10/1998
EP    1 447 359 A2    8/2004

* cited by examiner

*Primary Examiner*—Gene O. Crawford
*Assistant Examiner*—Leslie A Nicholson, III
(74) *Attorney, Agent, or Firm*—Oblon, Spivak, McClelland, Maier & Neustadt, P.C.

(57) ABSTRACT

The invention provides a device for sorting products, comprising bogies which are movable in a direction of transport along a conveying path, which bogies are pivotally interconnected, and supporting platforms comprising a supporting surface for supporting products to be sorted. Each of the supporting platforms includes supporting elements which are movable with respect to an adjacent supporting element for changing the circumference of the supporting platform in question during passage of a bend in the conveying path, which supporting elements include two outer supporting elements which, seen in the direction of transport, are located at the front side and the rear side, respectively, of the supporting platform in question and at least one intermediate supporting element positioned between the outer supporting elements. The device furthermore comprises a supporting device for supporting the supporting platforms on the bogies and a tilting device for tilting the supporting platforms about a tilt axis that extends parallel to the direction of transport. The support of the said at least one intermediate supporting element on the bogies takes place via the outer supporting elements.

63 Claims, 18 Drawing Sheets

DEVICE FOR SORTING PRODUCTS

BACKGROUND OF THE INVENTION

1. Field of the Invention

The present invention relates to a device for sorting products, comprising bogies which are movable in a direction of transport along a conveying path, which bogies are pivotally interconnected, supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, which supporting elements consist of two outer supporting elements which, seen in the direction of transport, are located at the front side and the rear side, respectively, of the supporting platform in question and at least one intermediate supporting element positioned between said outer supporting elements, supporting means for supporting the supporting platforms on the bogies, and tilting means for tilting the supporting platforms about a tilt axis that extends parallel to the direction of transport.

2. Discussion of the Background

Devices which are capable of discharging products sideways by tilting a supporting platform can be used in sorting various kinds of products, such as parcel post or pieces of luggage at airports. The above-described tilting of a supporting platform will cause a product supported on the supporting surface thereof to slide off the supporting surface under the influence of the force of gravity. Products can thus be sorted by having said tilting take place at a selected position.

A device as referred to in the introduction is described in U.S. Pat. No. 4,031,998. Said sorting device uses an endless chain, whose links can be regarded as bogies. Each link supports a leg comprising a lower leg part that is rigidly connected to the associated link and an upper leg part that is connected for lateral pivoting movement to the lower leg part. At its upper end, the upper leg part carries a slat-like supporting element that extends transversely to the direction of transport. A number of adjacent supporting elements jointly form a supporting platform. The supporting elements associated with a supporting platform partially overlap, so that lateral pivoting of an intermediate supporting elements will result in the remaining supporting elements pivoting along therewith, so that the supporting platform will pivot as a whole. Said pivoting of an intermediate supporting element is effected by vertically deflecting a cam wheel that is fixedly connected to an upper leg part.

A major advantage of the use of the slat-like supporting elements is that comparatively small relative movements between the supporting elements suffice for passing bends, while in addition the successive supporting surfaces of each supporting platform not only individually but also jointly form an at least substantially closed surface upon passing bends. In this way (parts of) products are prevented from getting wedged between adjacent supporting elements of either one supporting platform or of adjacent supporting platforms.

Besides the above advantages, the known sorting device also has major drawbacks. In the first place these are connected with the fact that the number of links is necessarily equal to the number of supporting elements. This implies that also the dimensions of the links and the supporting elements must be geared to each other. These preconditions impose significant restrictions on the designer of a sorting device as regards the design possibilities. Thus the designer will be confronted at some point with the limits of what is technically and economically feasible, given the fact that the dimensions of the supporting elements in the direction of transport must remain within bounds. After all, this would mean that it will also be necessary to use shorter links and that, in addition, a greater density of legs individually supporting the supporting elements will be required, which legs themselves will moreover need to be of increasingly smaller and more vulnerable construction.

Another important drawback is connected with the fact that a number of successive, mutually pivotable links are provided for supporting a single supporting platform. To an increasing extent, modern sorting devices are fitted with an electric motor for each supporting platform for tilting said supporting platform. Said electric motors move along with the supporting platforms. The mutually pivotable links are unsuited for attaching the electric motors thereto, however, or this is at least not easy to realise.

Partly because of the aforesaid drawbacks, designers refrain from the use of slat-like supporting elements in modern sorting devices comprising tilting supporting platforms, in spite of the above-described advantages thereof.

An example of such a modern sorting device is described in International patent application WO-A1-99/33719. More specifically, reference is made within the framework of the present invention to the second embodiment thereof, which is described with reference to FIGS. 10-13 of said International patent application. Said embodiment concerns a sorting system comprising an endless train of bogies that move in a direction of transport along a conveying path. Each bogie supports a main supporting surface comprising a product-supporting surface, whose dimensions in the direction of transport are larger than those in the direction perpendicular thereto. To prevent gaps being formed between main supporting surfaces of successive bogies, a bridging surface is provided both at the front side and at the rear side of each main supporting surface. The bridging surface at the front side of a main supporting surface can pivot with respect to a pivot axis that extends perpendicularly to the main supporting surface, and at the front side it abuts against the rear side of the supporting surface at the rear end of a next bogie. The bridging surface at the rear side of a main supporting surface is capable of limited movement against spring action in the direction of transport with respect to the main supporting surface. The front bridging surfaces ensure that no gaps are formed between main supporting surfaces of successive bogies when passing horizontal bends, whilst the rear bridging surfaces ensure that no gaps are formed between main supporting surfaces of successive bogies when passing vertical bends.

A drawback of such a prior art sorting device is the fact that because of the small number of supporting elements, being the main supporting surface and the bridging surfaces, and the dimensions thereof, the supporting elements move a relatively large distance and/or undergo a relatively large angular displacement with respect to each other during passage of a bend, as a result of which the position on a supporting platform of products present thereon may change undesirably while passing a bend. In addition to that there is a risk of gaps being formed between adjacent supporting platforms when a product finds its way between said supporting platforms and thereby forces the facing bridging surfaces of the respective supporting platforms apart.

Reference is furthermore made to European patent application EP-A2-869 086. Said patent describes a sorting device in which use is made of a train of supporting platforms, which are each capable of individual tilting movement and which each comprise two overlapping slat-like supporting elements, which can only tilt in unison. As with the sorting device according to U.S. Pat. No. 4,031,998, the number of links of the chain by which the supporting platforms are moved is related to the number of supporting elements, with all its limitations. Moreover, the possibility of individual tilting of the supporting platforms, which each have a comparatively small dimension, seen in the direction of transport, also makes the sorting device complex, costly and unsuitable for tilting the supporting platforms via (electric) motors that move along with said supporting platforms.

SUMMARY OF THE INVENTION

The object of the present invention is to provide a solution or at least an improvement, whether or not in preferred embodiments thereof, as regards the above-described drawbacks of prior art sorting devices comprising laterally pivotable supporting platforms. In order to accomplish that object, the invention provides a sorting device as referred to in the introduction in which the support of said at least one intermediate supporting element on the bogies takes place via the outer supporting elements. This achieves the important advantage that it is not necessary to provide a separate supporting leg supported on a separate bogie for each supporting element. This makes it possible to use a simpler construction comprising fewer parts for the sorting device, while in addition the dimensions of the supporting elements and the number of said elements are no longer directly related to the dimensions of the bogies and the number of bogies. This makes it possible in principle to freely select the number of intermediate supporting elements and the dimensions thereof, so that said aspects can be optimally geared to the field of application of the sorting device in question.

In a greatly preferred embodiment, the device according to the invention is characterized in that adjacent supporting elements are at their facing sides provided with a groove and with an edge extending into the groove of the adjacent supporting element, respectively, for retaining the adjacent supporting elements with respect to each other in the direction perpendicular to the supporting surface. The inherent overlap between adjacent supporting elements provided by the edge that extends into the groove prevents gaps being present or being formed between adjacent supporting elements, so that a closed supporting surface is provided at least at the location of the overlapping supporting elements. The absence of gaps between adjacent supporting elements is thus not only ensured when passing a straight section of a conveying path but also when passing a bend in the conveying path, providing that the degree of overlap is geared thereto. The overlap between the supporting elements furthermore makes it possible to have an adjacent supporting element tilt along with a supporting element that is being tilted and thus cause an entire supporting platform to tilt.

To obtain a simpler design of a supporting element, the groove is preferably formed by at least an upper groove edge, the upper side of which forms part of the supporting surface.

Preferably, the supporting elements of a supporting platform can only tilt in unison about the tilt axis. Thus it is not necessary to construct the slats so that they can tilt individually, which would increase the complexity of the construction of the sorting device.

The advantages of the invention become apparent in particular when more slender supporting elements are used, i.e. supporting elements exhibiting a more pronounced length-breadth proportion. As the dimensions of the supporting elements decrease, also the relative movement of the supporting elements will decrease in an absolute sense during passage of a bend, so that there is not a great risk of a product present on a supporting platform being displaced during passage of a bend, while in addition it is possible to provide the supporting surface with a profile without this interfering with the relative movement of the supporting elements. Consequently, the outer supporting elements are preferably made up of outer slats and/or the intermediate supporting elements are made up of intermediate slats. In those cases in which the term slat is used hereinafter, this term is understood to include the outer slats as well as the intermediate slats. The longitudinal direction of the slats extends transversely to the direction of transport. In general it applies in that a slat is a rectangular element of which the length and the breadth are in the proportion of at least three to one.

For reasons of constructional simplicity, each intermediate slat preferably has two horizontal flat sections, which are to overlap horizontal flat sections of adjacent slats on the two longitudinal sides of the intermediate slats, with the upper side of at least one part of the horizontal flat sections forming part of the supporting surface.

Preferably, the intermediate slats are provided between the outer slats in two alternating embodiments thereof, so that the required number of embodiments of the intermediate slats is limited to two, irrespective of the number of intermediate slats that are used for each supporting platform, and thus irrespective of the dimension of the supporting platform in the direction of transport. In this preferred embodiment, it is advantageous if the two horizontal flat sections of each intermediate slat are positioned at the same level at the longitudinal sides of said slat, seen in the direction perpendicular to the supporting surface.

On the other hand it may be advantageous if two horizontal flat portions are positioned at different vertical levels at the longitudinal sides of an intermediate slat. The fact is that such an embodiment makes it possible to provide the intermediate slats in only one embodiment thereof, and that consequently only one embodiment of the intermediate slats is needed as well, again irrespective of the number of intermediate slats that are used for each supporting platform, and thus irrespective of the dimension of the supporting platform in the direction of transport.

To increase the uniformity of the deformation of a supporting surface when the supporting platform passes a horizontal or a vertical bend in the conveying path, the length and the breadth of the intermediate slats are preferably in the proportion of at least four to one.

For the same reason it has appeared to be advantageous if the center-to-center distance between adjacent slats ranges between 30 mm and 80 mm and/or that the width of the slats is maximally 200 mm.

Quite preferably, the number of intermediate supporting elements is at least two. Since more than one intermediate supporting element is used, the deformation of a supporting surface that takes place when the supporting platform passes a horizontal or a vertical bend in the conveying path, causing the circumference of the supporting platform to change, can be distributed more uniformly over the area of the supporting surface. This in turn reduces the risk of a product being shifted on the supporting surface while passing a bend, causing it to take up a significantly different position on a supporting surface after a bend than before said bend, with the risk of the product falling off the supporting surface.

According to another preferred embodiment, each intermediate supporting element is provided with a vertically oriented stiffening rib. The stiffening rib increases the stiffness of the intermediate supporting element and thus of the supporting platform at least in the direction perpendicular to the supporting surface. This advantageously prevents inadmissible deflection of the intermediate supporting element, and thus of the supporting surface, under the influence of a downward force perpendicular to the supporting surface, which is in particular caused by the weight load of a product present on the supporting surface in practice, of course.

The stiffening rib preferably extends below a horizontal flat section of the associated intermediate supporting element. Thus the stiffening rib does not form an impediment in the space above the horizontal flat section, and the horizontal flat sections themselves can in principle function as bearing surfaces.

Alternatively, or in combination therewith, it may also be very advantageous, depending on the field of application, if the stiffening rib extends above a horizontal flat section of the associated intermediate supporting element. In this way the stiffening ribs, more specifically the upper edges thereof, can support products to be sorted, as a result of which the products to be sorted do not make contact with the supporting platform over their entire bottom area. This latter aspect may be advantageous with a view to making it easier for a product to slide off a tilted supporting platform. Insofar as the stiffening ribs extend above horizontal flat sections of associated supporting elements, the stiffening ribs are preferably evenly distributed over the supporting surface, and preferably the entire area of the supporting surface is provided with stiffening ribs extending above horizontal flat sections of associated supporting elements. Precisely because of the small extent of relative movement during passage of a bend, it is possible to use a comparatively high density of the stiffening ribs.

In particular from this latter viewpoint it is advantageous in that connection if the stiffening rib has a tapered upper edge, so that the contact between products to be sorted and the supporting platform is further reduced.

To achieve that supporting elements take up the correct position relative to each other, each supporting platform preferably comprises spring means that are operative between adjacent supporting elements.

If the stiffness of the spring means is lower in the direction of transport than in the direction perpendicular to the supporting surface, the spring means can contribute substantially to the stiffness of the supporting platform in the direction perpendicular to the supporting surface.

Especially, but not exclusively, for use in the preceding preferred embodiment, the spring means preferably comprise leaf elements oriented perpendicularly to the supporting surface.

For the sake of constructional simplicity, at least two leaf elements are preferably provided between two adjacent supporting elements, which leaf elements are interconnected at one end and which act on the respective two adjacent supporting elements via the opposite ends. The two leaf elements may be configured as one integral part.

Preferably, said leaf elements are leaf spring elements, as a result of which the spring action is at least partially obtained from the properties of the material of the leaf elements.

Alternatively, or in combination with the preceding preferred embodiment, it is also possible for the two leaf elements to be pivotally interconnected, in which case the spring means furthermore preferably comprise a torsion spring at the location of the pivoted joint, which torsion spring functions to resist pivoting movement of the two leaf elements with respect to each other from a neutral position.

A constructionally very advantageous embodiment is obtained if the spring means act on at least one stiffening rib. Thus, the stiffening rib is given an additional function.

A very simple assembly of a supporting platform can be realised if, according to another preferred embodiment, the spring means comprise an elastically deformable spring member, to which at least three, more preferably all, supporting elements associated with a supporting platform are attached. The spring member might extend in a backbone-like manner at the bottom side of the supporting platform in that case.

It is furthermore advantageous for the spring member to comprise a regular pattern whose pitch corresponds to the spacing between adjacent supporting elements, thus enabling an optimum gearing of the shape of the spring member and that of the supporting platform.

To realize a simple assembly it is furthermore generally preferable for the spring means to be connected to supporting elements via snap connections.

To control/limit the movement of the supporting elements relative to each other, each supporting platform preferably comprises stop means for limiting the movement that two adjacent supporting elements can make relative to each other. This makes it possible to prevent (overly large) gaps being formed between adjacent supporting elements yet.

The stiffening ribs preferably form part of the stop means, which adds further functionality to the stiffening ribs.

If the stop means comprise hook members, it can be achieved that one supporting element will carry along the adjacent supporting element when, in the case of an increasing movement of one supporting element relative to another supporting element, said movement reaches a specific magnitude, so that the relative movement will not increase any further or that the adjacent supporting element will block any further movement of said one supporting element.

The hook members preferably act in a plane parallel to the supporting surface, so that the hook members may furthermore function to prevent movement of the supporting elements in the direction perpendicular to the direction of transport and parallel to the supporting surface.

The supporting means preferably comprise at least one supporting leg for each supporting platform, which leg functions to support the associated supporting platform.

Quite preferably, the supporting means support the supporting platforms via the outer supporting elements. In that case the intermediate supporting elements can be suspended between the outer supporting elements, as it were, without ruling out the possibility of providing additional support for intermediate supporting elements within the framework of this preferred embodiment.

To support the supporting platforms via the outer supporting elements, the supporting means quite preferably comprise two supporting legs for supporting the outer supporting elements of the supporting platforms.

Even more preferably, the two supporting legs are rigidly connected to the outer supporting elements of the supporting platforms. This achieves that no gaps are formed between adjacent supporting platforms, more specifically between adjacent outer supporting elements of adjacent supporting platforms, because the two outer supporting elements, apart from the tilting movement about the tilt axis, cannot move relative to each other, so that no gaps can be formed.

Very stable tilting can be realised in a constructionally simple manner if the supporting legs are jointly tiltable about the tilt axis with the associated supporting platforms as a result of the action of the tilting means.

It is furthermore preferable in that connection if the supporting means comprise fixed legs, which are fixedly connected to a bogie and to which the supporting legs are tiltably about the tilt axis connected.

If two adjacent supporting legs of adjacent supporting platforms are tiltably connected to one and the same fixed leg, useful use is made of the fixed leg, making it possible to reduce the number of required components and thus the constructional complexity of the device according to the present preferred embodiment.

According to an important preferred embodiment, the tilting means cause the supporting platforms to tilt via one of the outer supporting elements. The other supporting elements of a supporting platform can be carried along via the respective outer supporting elements, so that the supporting platform will tilt as a whole. Consequently, it suffices to tilt only one outer supporting element in order to tilt an entire supporting platform.

To assist in the tilting movement of all the supporting elements of a supporting platform along with said one supporting element, connecting means are preferably provided for mechanically connecting the supporting legs of a supporting platform parallel to the supporting surface in those cases in which two supporting legs are used for the respective outer supporting elements. Thus, tilting movement of one of the two supporting legs results in the other supporting leg being moved along via the connecting means.

Said connecting means are preferably arranged for moving the supporting legs in at least two degrees of freedom, more preferably in at least three degrees of freedom with respect to each other. This makes it possible for the connecting means to be operative also when passing a horizontal bend, a vertical bend or a combined horizontal/vertical bend in the conveying path.

Quite preferably, the two supporting legs associated with a supporting platform are supported on two different bogies. A change in the orientation of the two different bogies with respect to each other, as takes place when passing a bend in the conveying path, may automatically lead to a change in the orientation of the outer supporting elements of a supporting platform with respect to each other in that case, and thus to a change in the circumference of the supporting platform, so that no gaps will form between two adjacent supporting platforms even when passing a bend.

To increase the stiffness of the supporting platform in the direction perpendicular to the supporting surface, the supporting means preferably comprise at least one supporting body extending along adjacent intermediate supporting elements for each supporting platform, which functions to support the adjacent intermediate supporting elements. Such a supporting body may function exclusively for taking up incidental high loads higher than the normal operating loads, but it may also function to take up normal operating loads.

A constructionally advantageous position for the supporting body is obtained if the supporting body extends under the adjacent intermediate supporting elements.

Alternatively, the supporting body preferably extends through holes in the adjacent intermediate supporting elements. In this way the supporting body can act in two different directions perpendicular to the supporting surface.

The dimensions of the holes in the direction parallel to the supporting surface and perpendicular to the direction of movement are preferably larger than the dimensions of the holes in the direction perpendicular to the supporting surface. On the one hand this achieves that even a limited vertical movement of the supporting surface may result in contact being established between the supporting elements and the supporting body, so that the stiffness-enhancing action of the supporting body becomes noticeable, whilst on the other hand it remains possible to pass a horizontal bend, which may require movement of (part of) the supporting body over a relatively large distance along the supporting elements parallel to the supporting surface.

Preferably, some play exists between the supporting body and at least part of the adjacent supporting elements in the unloaded, neutral position of the associated supporting platform. The term unloaded position is understood to mean the situation in which no product to be sorted is being supported on the supporting surface. The term neutral position is understood to mean the situation during passage of a rectilinear part of the conveying path. When a bend is reached and the slats move relative to each other, the supporting body does not interfere with said relative movement of the slats.

Furthermore preferably, some play exists between the supporting body and the adjacent supporting elements in the unloaded, non-neutral position of the associated supporting platform, so that the supporting body will not interfere with the movement of the supporting elements relative to each other upon passing from a bend to a straight part of the conveying path, either.

A constructionally advantageous embodiment is obtained if the supporting body is rigidly connected to at least one supporting leg.

A maximum effect per amount of supporting body can be obtained if said at least one supporting element extends parallel to the direction of transport from an outer supporting element.

When two supporting legs are used for the respective outer supporting elements, as already described above, at least two supporting bodies are preferably provided for each supporting platform, which supporting bodies are each rigidly connected to one of the two supporting legs. Thus the number of supporting elements being supported by a supporting body can be reduced, as a result of which also the required length and the amount of deflection at the end of the supporting body will decrease.

Furthermore preferably, at least four supporting bodies are provided for each supporting platform, which supporting bodies are each rigidly connected to one of the two supporting legs. This makes it possible to provide support on either side of the center line, parallel to the direction of transport, which may be desirable in situations in which products are positioned off-center on the supporting surface.

To increase the uniformity of the construction, the supporting bodies preferably have free ends that face towards each other.

On the other hand it may be very advantageous if the supporting bodies partially overlap, as seen in the direction of transport. This makes it possible to realize an increased stiffness at the location of the overlap.

An effective attachment of said at least one supporting body is realized if said at least one supporting body is rigidly connected to one intermediate supporting element, which is furthermore preferably positioned in the center of the associated supporting platform, as seen in the direction of transport.

An adequate support of the other supporting elements of a supporting platform from an intermediate supporting element can be achieved if said at least one supporting body extends on either side of the intermediate supporting element to which it is rigidly connected.

It is furthermore noted that the latter preferred embodiments, in which at least one supporting body is used which is rigidly connected to an intermediate supporting element for supporting (all) adjacent supporting elements associated with a supporting platform, can also be used in sorting devices in which the support of intermediate supporting elements on the bogies does not take place via the outer supporting elements, but via the intermediate supporting element to which said at least one supporting body is rigidly connected. In that case a device for sorting products is provided which comprises bogies which are movable in a direction of transport along a conveying path, which bogies are pivotally interconnected, supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, which supporting elements consist of two outer supporting elements which, seen in the direction of transport, are located at the front side and the rear side, respectively, of the supporting platform in question and at least one intermediate supporting element positioned between said outer supporting elements, supporting means for supporting the supporting platforms on the bogies, and tilting means for tilting the supporting platforms about a tilt axis that extends parallel to the direction of transport, wherein the supporting means comprise at least one supporting body for each supporting platform, which is rigidly connected to one intermediate supporting element and which extends on either side of the intermediate supporting element in question, along the adjacent supporting elements of the supporting platform for supporting the adjacent supporting elements, and wherein the support of the supporting platform on a bogie takes place via the intermediate supporting element. It will be understood by those skilled in the art that such a sorting device can also be advantageously used in the previously described preferred embodiments, in particular as regards the construction of the supporting elements themselves and as regards spring means that are used.

If the outer supporting elements at the front side and the rear side of the associated supporting platform are provided with guard surfaces oriented perpendicularly to the supporting surface and extending below the level of the supporting surface, the risk of products finding their way between two adjacent supporting platforms can be eliminated or at least reduced. In principle said risk is present in particular if a supporting platform is in the neutral position and an adjacent supporting platform returns from the tilted position to the neutral position, so that a scissor-like movement is made, as it were.

The advantages of the present invention become manifest in particular (but not exclusively) if the tilting of the supporting platform is not effected in a purely mechanical manner, which would mean that tilting would only be possible during movement of the supporting platforms in the direction of transport, but if said tilting is effected via driving means moving along therewith. Consequently, the bogies are preferably provided with driving means for placing the tilting means in their operative position.

Furthermore preferably, the driving means comprise one electric motor for each bogie. The supply of electric power for said electric motors can be realised in various ways, for example via inductive power transmission (IPT) or by using a sliding contact.

BRIEF DESCRIPTION OF THE DRAWINGS

The invention will be explained in more detail hereinafter in the description of a number of preferred embodiments of sorting devices according to the invention, in which reference is made to the following figures.

DETAILED DESCRIPTION OF THE PREFERRED EMBODIMENTS

Insofar as this cannot lead to confusion, like parts will be indicated by the same numerals in the following description of the various figures.

Figure 1:
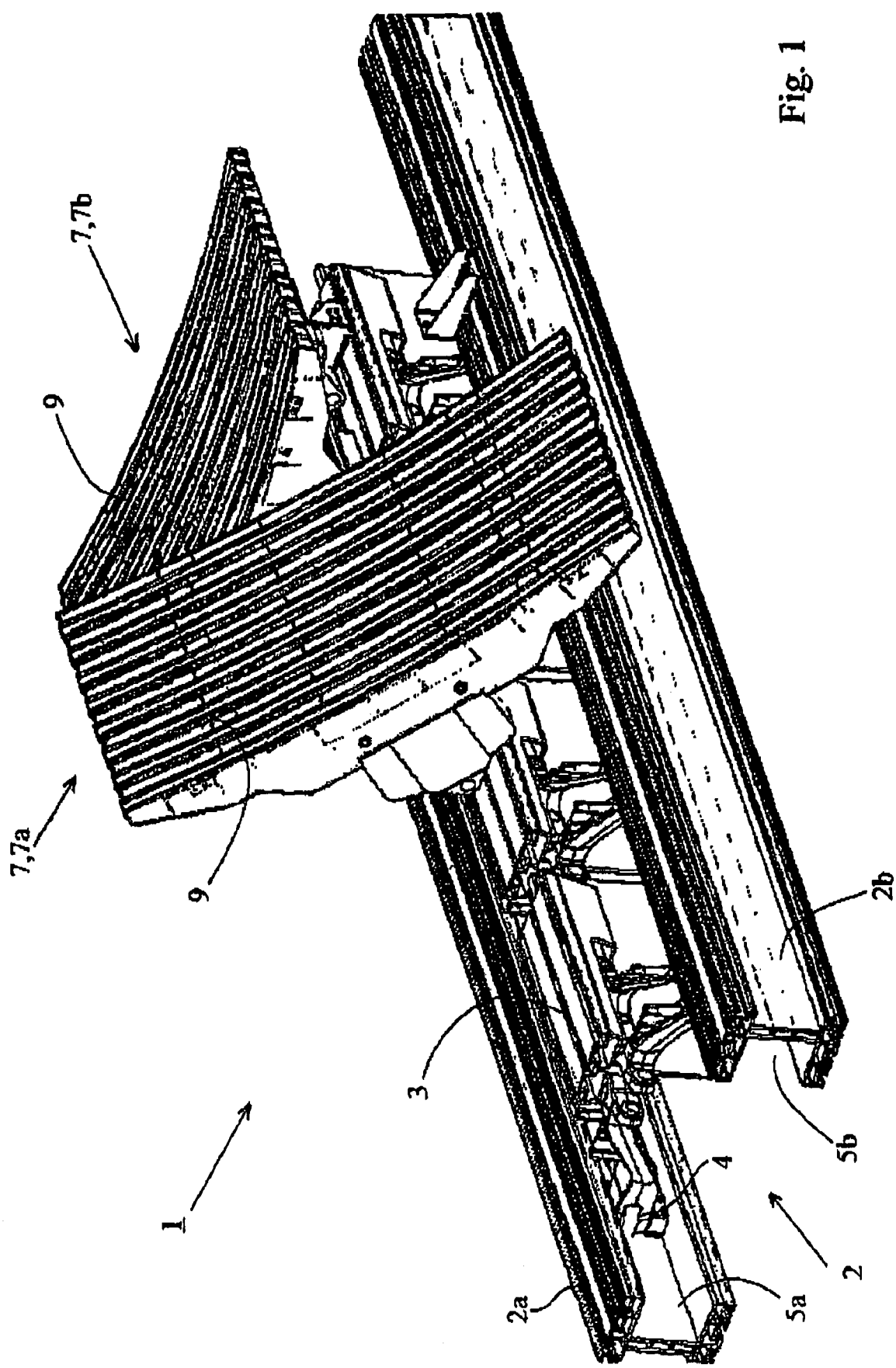
FIG. 1 is a perspective view of a sorting device according to the invention.
Figure 2:
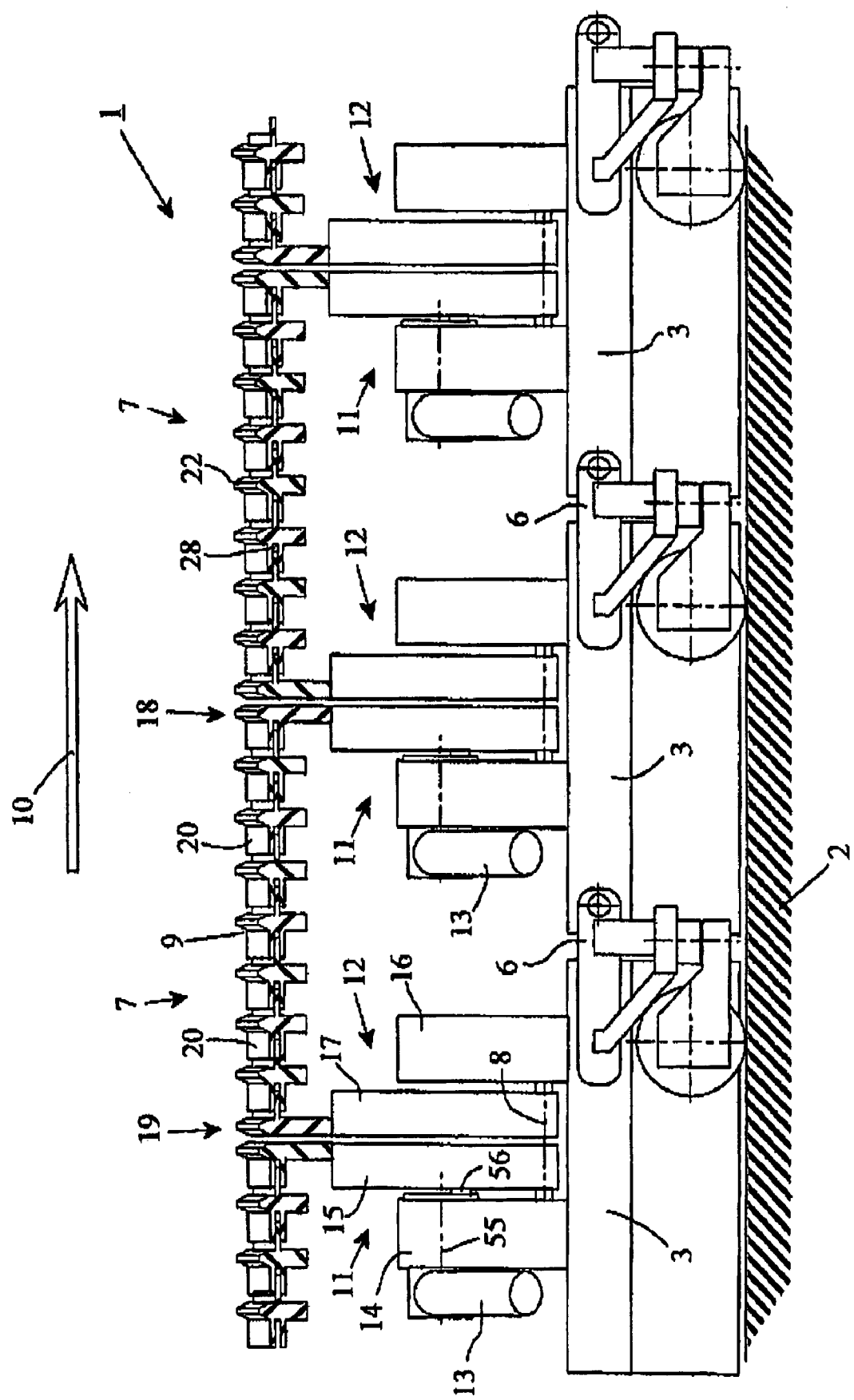
FIG. 2 is a schematic side view of the sorting device.

The sorting device 1 according to FIGS. 1 and 2 (which show only a small part of the sorting device 1) comprises an endless track 2 provided with two guide sections 2a, 2b. The track 2 defines an endless conveying path, along which bogies 3 can move in a direction of transport 10. To that end the bogies 3 are provided with wheels 4, which run within U-shaped recesses 5a, 5b, which face one another, of the respective guide sections 2a, 2b. The bogies 3 form an endless train along the conveying path, being interconnected by universal joints 6 (FIG. 2) in such a manner that the train of bogies 3 is capable of passing not only straight sections of the conveying path but also horizontal bends as well as vertical (concave or convex) bends. In a bend, successive bogies take up a particular angular position with respect to each other, which is possible on account to the fact that they are interconnected by means of the universal joints 6. The endless train is driven along the endless conveying path by driving means (not shown), for example in the form of linear motors as known to those skilled in the art.

The sorting device 1 further comprises supporting platforms 7, whose number equals the number of bogies 3. Each supporting platform 7 has a supporting surface 9, which has a slightly concave shape, seen in the perpendicular to the direction of transport 10. For the sake of clarity the supporting platforms 7 are shown in vertical cross-section through their centers in FIG. 2. The supporting surfaces 9 are intended to support products to be sorted, which does not rule out the possibility of a single product to be sorted extending over two or even more than two supporting platforms 7 if the dimensions of a single supporting surface 9 would be insufficient for supporting the product in question without said product projecting outside the supporting surface 9. The slightly concave shape of the supporting surface 9 prevents or at least reduces the possibility of products sliding off the supporting surface 9 upon passing a horizontal bend.

The supporting platforms 7 are capable of individual tilting movement with respect to the bogies 3 about a tilt axis 8 that extends parallel to the conveying path. FIG. 1 shows the supporting platform 7a in the tilted position thereof, while the supporting platform 7b is shown in the non-tilted position. When a supporting platform 7 is tilted, which can take place in two opposite directions, a product being supported on the supporting surface 9 will slide off the supporting platform 7 in question under the influence of the force of gravity. Sorting of the products can take place by having such tilting take place at selected positions, for example in dependence on data relating to the destination of the product in question.

The supporting platforms 7 are each supported on two successive bogies 3 via a front supporting element 11 and a rear supporting element 12. The front supporting element 11 is provided with tilting means, comprising an electric motor 13, among other components, wherein use is made of cams 56 rotating about an axis of rotation 55, which pass through grooves, causing the supporting platforms 7 to tilt. Said tilting means are extensively described in European patent application EP 04075426.9, to which reference is made herein. Said European patent application is considered to be incorporated herein by this reference as far as the description of the tilting means is concerned.

The front supporting element 11 comprises a fixed supporting leg 14, with respect to which the cam 56 rotates about the axis of rotation 55 upon activation of the electric motor 13, and a supporting leg 15 capable of tilting movement about the axis 8, which comprises the groove/grooves through which the cam 56 passes. The rear supporting element 12 likewise comprises a fixed supporting leg 16, as well as a supporting leg 17 that is capable of tilting movement about the tilt axis 8. Unlike the front supporting element 11, the rear supporting element 12 is passive in the sense that the tiltable supporting leg 17 thereof only tilts along with the tiltable supporting leg 15, which is to that end actuated by the tilting means associated with the front supporting element 11 provided with the electric motor 13.

The supporting platform 7 comprises a number of concave slats consisting of a front slat 18 and a rear slat 19 at the front side and the rear side, respectively, of a supporting platform 7, with a number of identical intermediate slats 20 present therebetween.

Figure 4A:
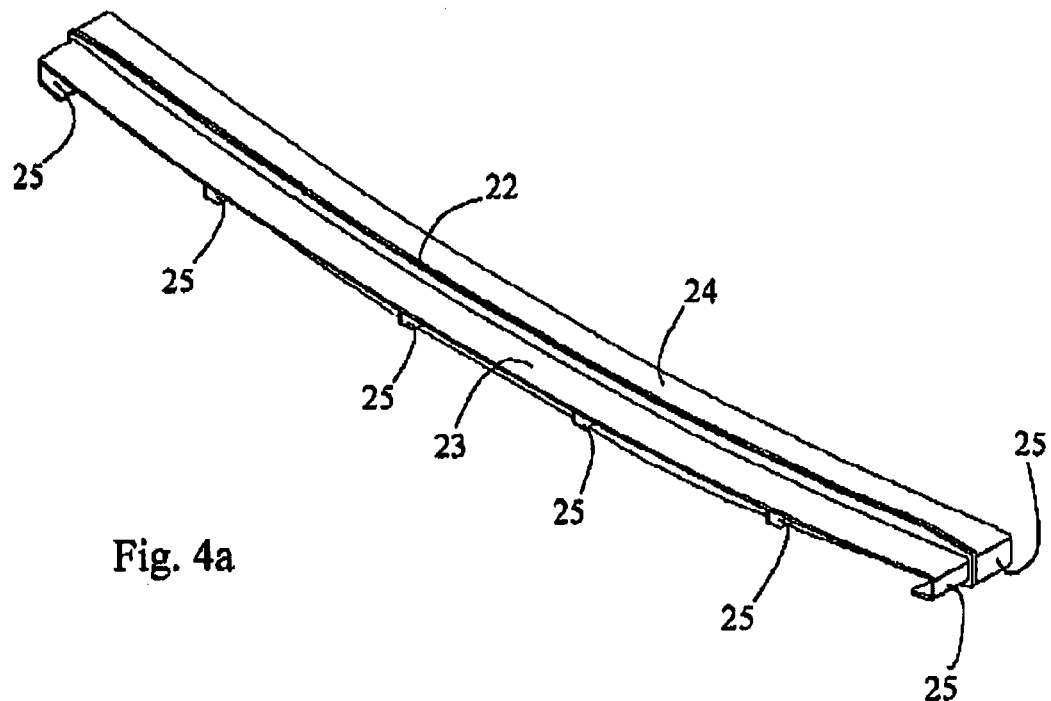
FIGS. 4a and 4b are two different perspective views of an intermediate slat.

The intermediate slats 20 (also refer to FIGS. 4a and 4b) are injection-moulded plastic products comprising a vertical stiffening rib 21 having an upper edge 22 that tapers off in a direction transversely to the intermediate slats 20. A front horizontal flat section 23 and a rear horizontal flat section 24 extend at the front side and the rear side, respectively, of the stiffening rib 21, perpendicularly thereto. To provide the required stiffness between the stiffening rib 21 and the flat sections 23, 24, a number of tie plates 25 are provided along the length of the intermediate slats 20.

The front horizontal flat section 23 is positioned just below the level of the rear horizontal flat section 24. A number of parts 26 of inverted U-shape are provided below the rear horizontal flat section 24, being spaced therefrom by a distance which is greater, to a limited extent, than the thickness of the front horizontal flat section 23. The upper side of the U-shaped parts 26 and the lower side of the rear horizontal flat section 24 define a groove 27 therebetween, which groove does not extend along the entire length of the intermediate slat 20 but which is only present at the location of the U-shaped parts 26. The front horizontal flat section 23 of an adjacent intermediate slat 22 or of the rear slat 19 extends within said groove 27.

The rear slat 19 substantially corresponds to the front half of an intermediate slat 20, including the stiffening rib 21, whilst the front slat 18 corresponds to rear half of an intermediate slat 20, including the stiffening rib 21.

As a result of the vertical retainment of the intermediate slats 20, which is obtained on account of the front horizontal flat sections 23 extending within the grooves 27 of adjacent slats 18, 20, the intermediate slats 20 are supported via the adjacent slats 18, 19, 20 without additional support of the intermediate slats 20 being necessary. Within the framework of the present invention additional support of the intermediate slats 20 is possible, though, as will become apparent hereinafter.

The front slat 18 and the rear slat 19 are rigidly connected to the front tiltable supporting leg 15 and to the rear tiltable supporting leg 17, respectively. Because of the interlocking engagement between the slats 18, 19, 20 and the rigid connection between the front tiltable supporting leg 15 and the front slat 18, not only the front slat 18 but also the other slats 19, 20 of the supporting platform 7 in question will tilt along with the front tiltable supporting leg 15 as soon as the front tiltable supporting leg 15 is tilted about the tilt axis 8 as a result of the electric motor 13 being activated. Because of the rigid connection between the rear slat 19 and the rear tiltable supporting leg 17, also the latter will tilt along about the tilt axis 8.

Figure 3A:
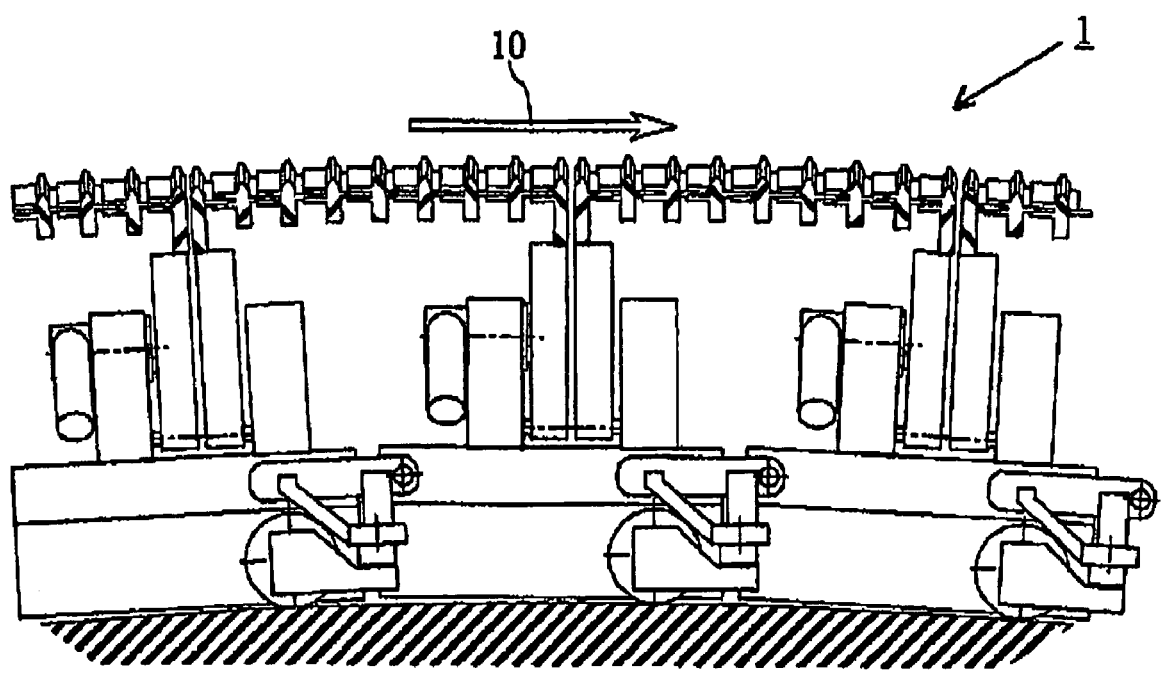
FIGS. 3a and 3b show the sorting device during passage of a convex bend and a concave (vertical) bend, respectively.
Figure 3B:
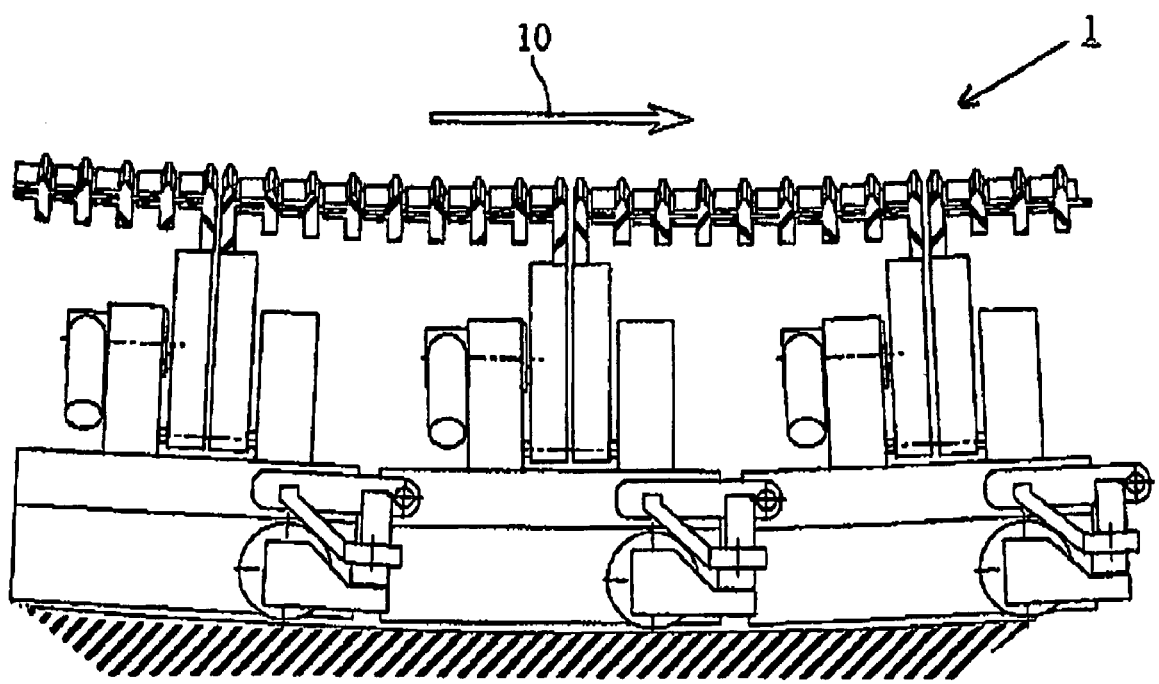

FIGS. 3a and 3b show the sorting device 1 during passage of a convex bend and a concave bend, respectively, in the conveying path. The figures clearly show how the center-to-center distance between the slats 18, 19, 20 increases in the convex bend, while on the other hand said center-to-center distance the increases in the concave bend. Said change in the center-to-center distance is possible in that a certain amount of play, seen in the direction of transport 10, exists between the slots 27 and the front horizontal flat sections 23 that extend therein.

Figure 5A:
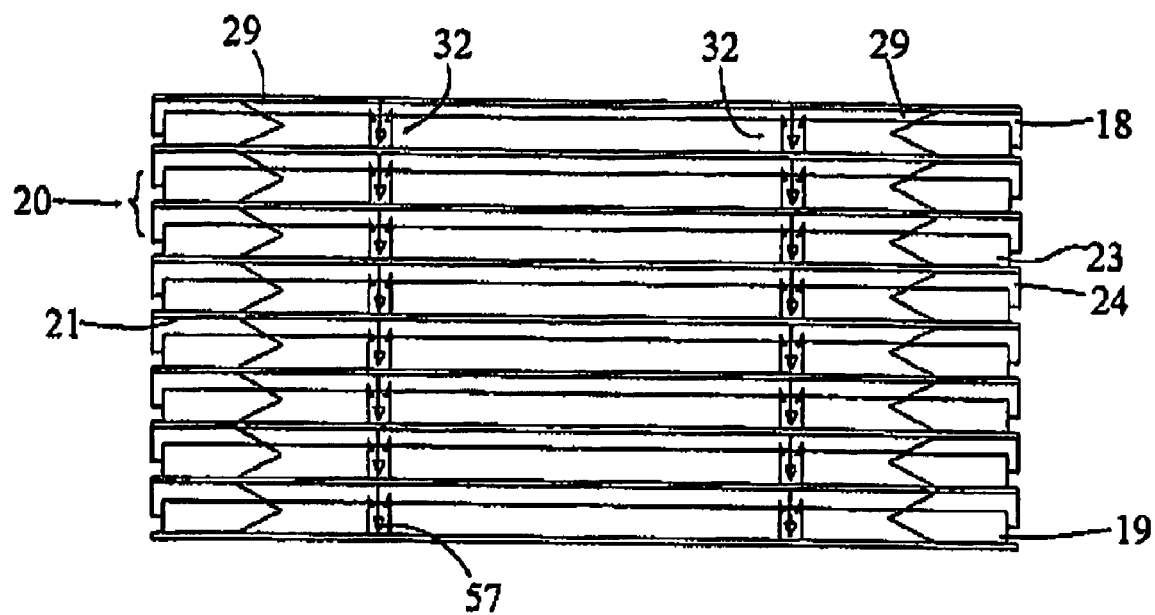
FIG. 5a is a schematic bottom view of the underside of a supporting platform.
Figure 5B:
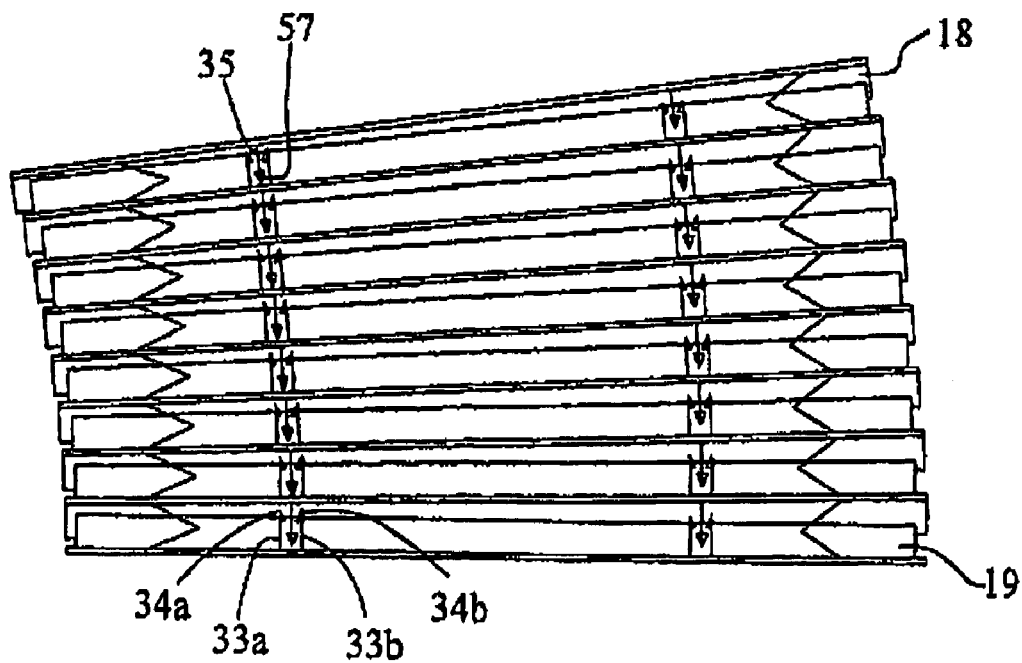
FIG. 5b shows the underside of the supporting platform during passage of a horizontal bend.
Figure 7:
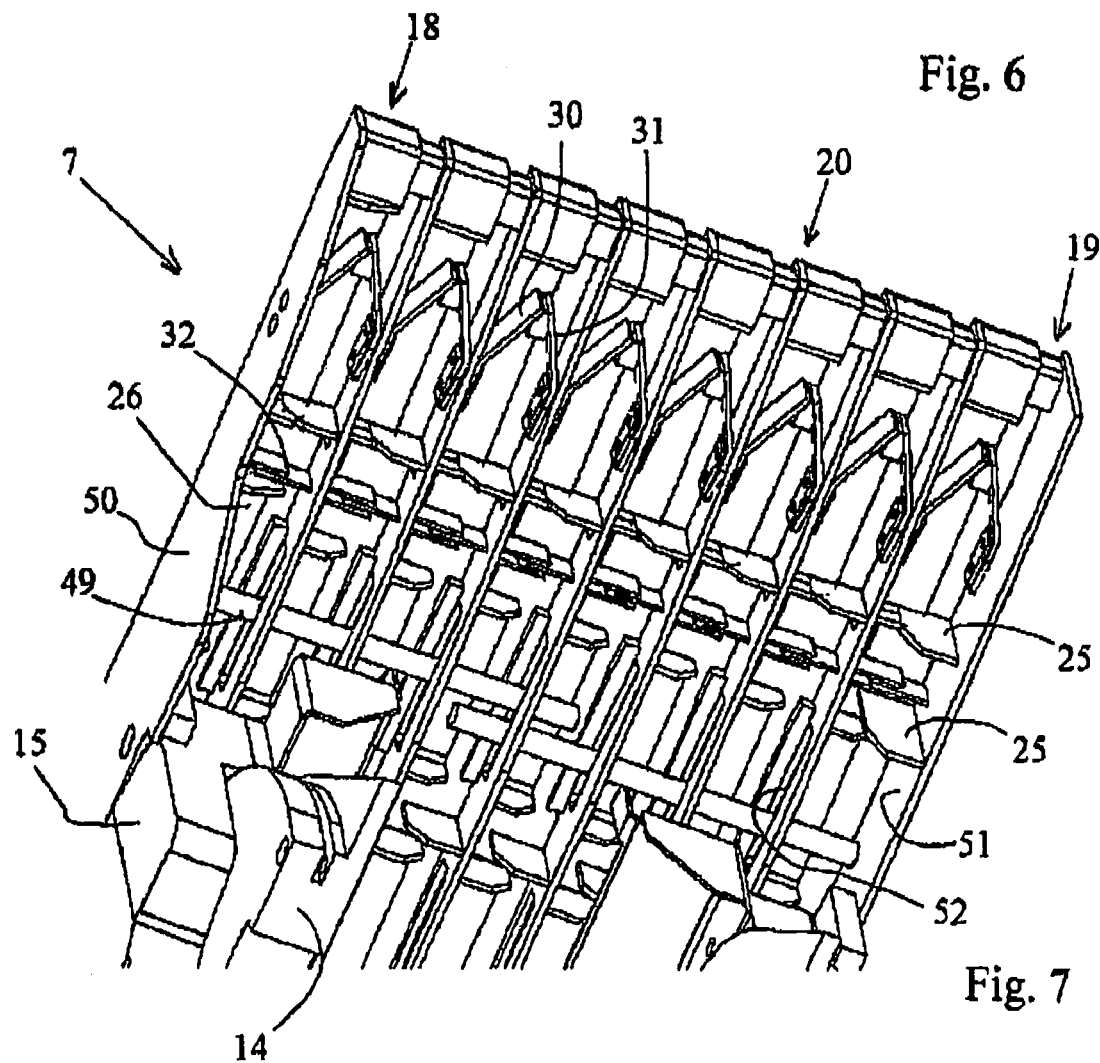
FIG. 7 is a perspective bottom view of a supporting platform of a second variant of the sorting device.

To achieve that the intermediate slats 20 return to their starting position as shown in FIG. 2 after passing the bend, spring means are operative between the slats 18, 19, 20. This is illustrated in FIGS. 5*a* and 5*b*, which show a supporting platform 7 in bottom view during passage of a straight part of the conveying path and of a horizontal bend of said conveying path, respectively. Also FIG. 7 is relevant in this connection, although FIG. 7 relates to a variant of the sorting device 1 as described so far. This variant is to a significant extent similar to the sorting device 1 as described so far.

Figure 4B:
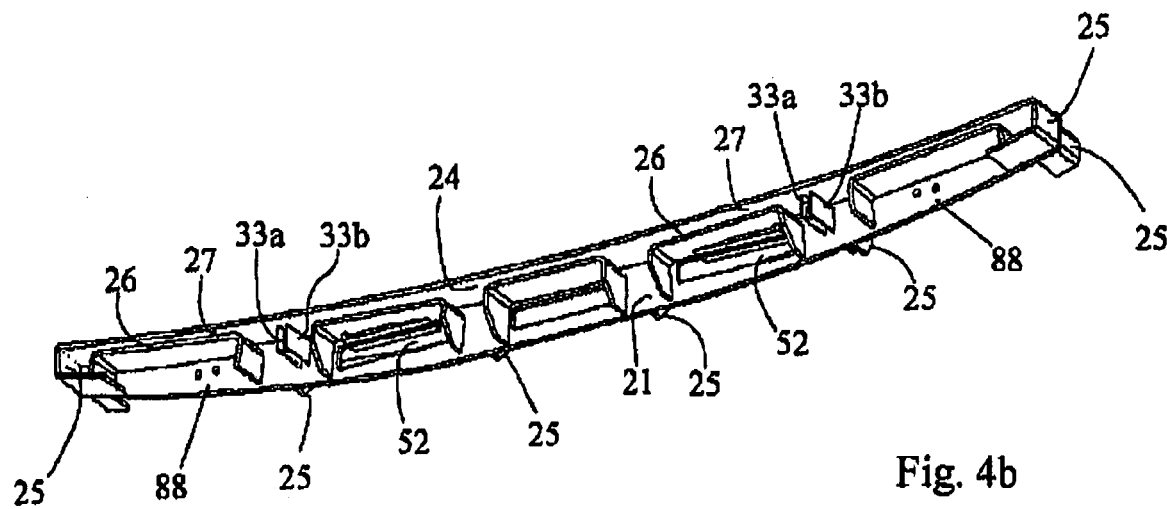

Leaf spring means 29 are provided between the slats 18, 19, 20 near the ends thereof, which leaf spring means each comprise two leaf spring strip members 30, 31 jointly defining a V-shape, as seen in bottom view. The leaf spring strip members 30, 31 are pivotally interconnected in the point of the V-shape, while at the opposite ends the leaf spring strip members 30, 31 are fixed to the stiffening ribs 21 of two adjacent slats 18, 19, 20 at the location of holes 88 in the stiffening rib 21 (FIG. 4*b*). The spring force of the leaf spring means 29 may result from the resilience of the material of the leaf spring strip elements 30, 31, but alternatively, or in addition thereto, it may also be obtained by making use of a torsion spring at the location of the pivoted connection between the leaf spring strip elements 30, 31. Alternatively, other types of springs may be used, of course. The advantage of using leaf spring strip elements 30, 31 that are oriented perpendicularly to the supporting surface 9 is that in this way the leaf spring means 29 also contribute to the stiffness of the connection between two adjacent slats 18, 19, 20 in the direction perpendicular to the supporting surface 9. Because of the symmetrical positioning of the leaf spring means 29, said means will tend to force the slats 18, 19, 20 to the position that is shown in FIG. 5*a*.

Furthermore, two hook members 32 are operative in a mirror-symmetrical manner between two adjacent slats 18, 19, 20. The hook members 32 comprise two strip elements 33*a*, 33*b* extending perpendicularly to the supporting surface 9 in the direction of transport 10 from the slats 19, 20, which strip elements comprise facing hooks 34*a*, 34*b* at their ends and a strip element 35 extending from an adjacent slat 18, 20, which has a point 57 that extends between the hook members 33*a*, 33*b*. In the outside bend (see FIG. 5*b*), the hook members 32 prevent the angular distortion between adjacent slats 18, 19, 20 from becoming too large in that the point 57 of the hook member 35 cannot pass the hooks 34*a*, 34*b* of the hook members 33*a*, 33*b*. In the other direction, the ends of the hooks 34*a*, 34*b* or of the point 57 may strike against a stiffening rib 21. The hook members 32 function to contribute to a maximally homogeneous distribution of the relative movements of the slats 18, 19, 20 of a supporting platform during passage of a bend. In addition, the hook members 32 give the slats 18, 19, 20 greater stiffness as regards the movement of said slats relative to each other in their longitudinal direction.

Figure 6:
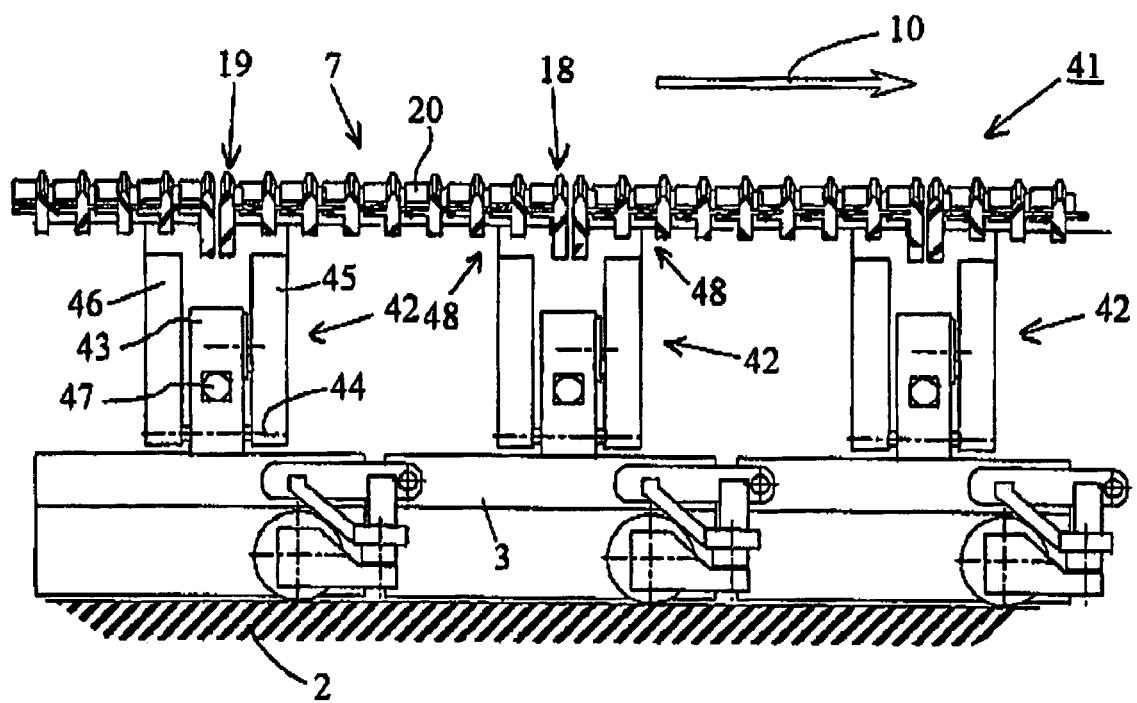
FIG. 6 is a schematic side view of a first variant of the sorting device.

FIG. 6 shows a first variant of the sorting device 1, viz. the sorting device 41. As may be apparent from the corresponding numerals, numerous similarities exist between the sorting device 41 and the sorting device 1. Thus, the bogies 3 and the supporting platforms 7 are identical. A first difference concerns the embodiment of the supporting elements 11, 12, which have been substituted for supporting elements 42 in the sorting device 41. Each supporting element 42 comprises a single fixed supporting leg 43, with respect to which a tiltable rear supporting leg 45 can pivot about the tilt axis 44 at the front side of the fixed supporting leg 43 and with respect to which a front tiltable supporting leg 46 can pivot about the tilt axis 44 at the rear side of the fixed supporting leg 43. The tilting mechanism that is used is in fact identical to the tilting mechanism as used in the sorting device 1, with this difference that the electric motor 47 is oriented differently, viz. perpendicularly to the direction of transport 10, so that it extends between the rear tiltable supporting leg 45 and the front tiltable supporting leg 46 associated with a specific supporting element 42.

The front tiltable supporting legs 46 and the rear tiltable supporting legs 45 are rigidly connected to, respectively, the front slats 18 and the rear slats 19 of the supporting platforms 7 via rigid connecting elements 48. In FIG. 6, said connecting elements 48 are schematically represented as T-shaped elements, with the bottom side of the vertical part thereof being rigidly connected to a tiltable supporting leg 45, 46 and one end of the horizontal part being rigidly connected to a front or a rear slat 18, 19. The horizontal part may be configured as a rod 49 extending through holes in the stiffening ribs 21, as is shown in FIG. 7.

FIG. 7 is a perspective bottom view of one half of a supporting platform 7 of a second variant of the sorting device 1. The variant that is shown in figure 7 is different from the sorting device 1 as shown in, for example, FIG. 2 as regards the manner in which the supporting platform 7, or more specifically the intermediate slats 20 thereof, is (are) supported. Rods 49 extending parallel to the direction of transport 10 are used for this purpose, which rods are rigidly connected via guard plates 50, 51 to the respective tiltable supporting legs 15, 17. The rods 49 extend from the guard plates 50, 51 to just beyond the center of the supporting platform 7, so that they partially overlap at the location of said center. The center intermediate slats 20 can thus experience some support from the rods 49 that extend from the two guard plates 50, 51.

The rods 49 extend through slotted holes 52 provided at the location of the second and the fourth part 26 of inverted U-shape of each intermediate slat 20. The dimensions of said slotted holes 52 have been selected so that in principle the rods 49 will not come into contact with the circumference of the slotted holes 52 upon passing vertical bends as well as horizontal bends in a conveying path. Such contact only occurs when the load on the supporting platforms 7 in the direction perpendicular to the supporting surface 9 exceeds a predetermined threshold value, for example due to the fact that too heavy a product is placed on the supporting surface 9, or that a product is placed off-center on the supporting surface 9. Because of the (in principle) contactless situation between the rods 49 and the slotted holes 52, there will be little or no wear caused by frictional contact between the outer side of the rods 49 and the circumferential edges of the slotted holes 52.

Alternatively, it would be possible within the framework of the invention to allow contact between the rods 49 and the slotted holes 52, more specifically between the bottom side and the upper side thereof in situations in which the supporting platform is nominally loaded, so that the intermediate slats 20 will experience the support from the rods 49 at an earlier stage, so that there will be less sagging.

Figure 8:
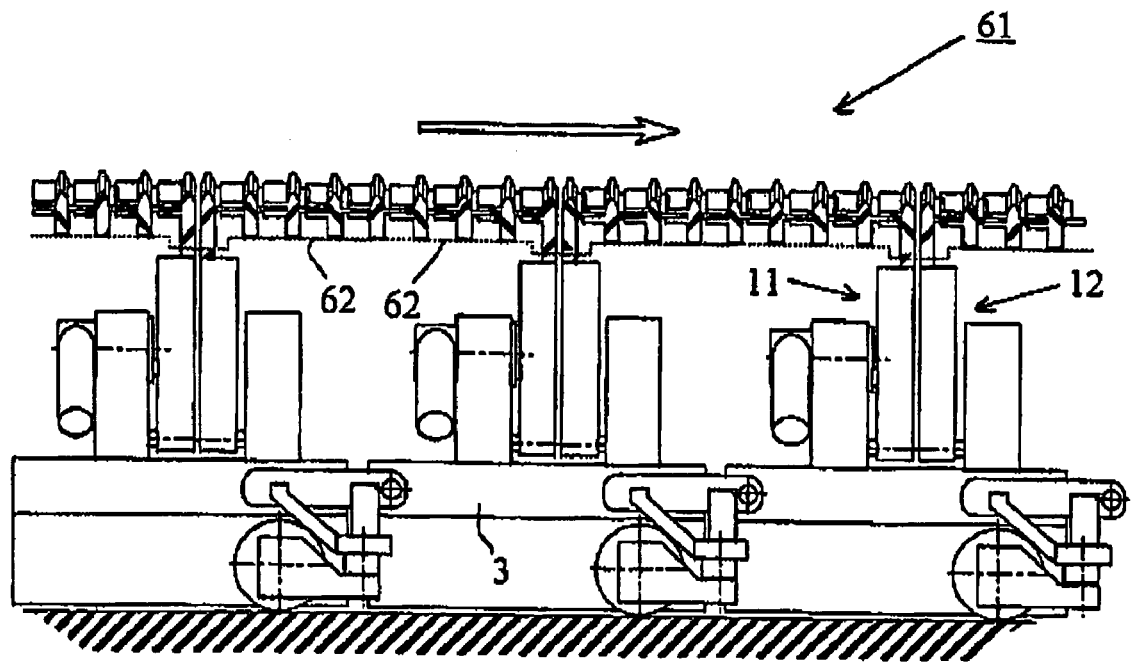
FIG. 8 is a schematic side view of a third variant of the sorting device.

The sorting device 61 that is shown in FIG. 8 is different from the sorting device that is shown in FIG. 6 as regards the positioning of the rods 62. Like the rods 49, the rods 62 are provided on either side of a supporting platform 7, the rods 62 are aligned, however, without overlapping in their longitudinal direction. In addition to that, the rods 62 do not extend through holes in the stiffening ribs of the intermediate slats 20 but, on the contrary, just below the stiffening ribs 21, so that the support of the intermediate slats 20 takes place via the undersides of the stiffening ribs 21 thereof.

Figure 9A:
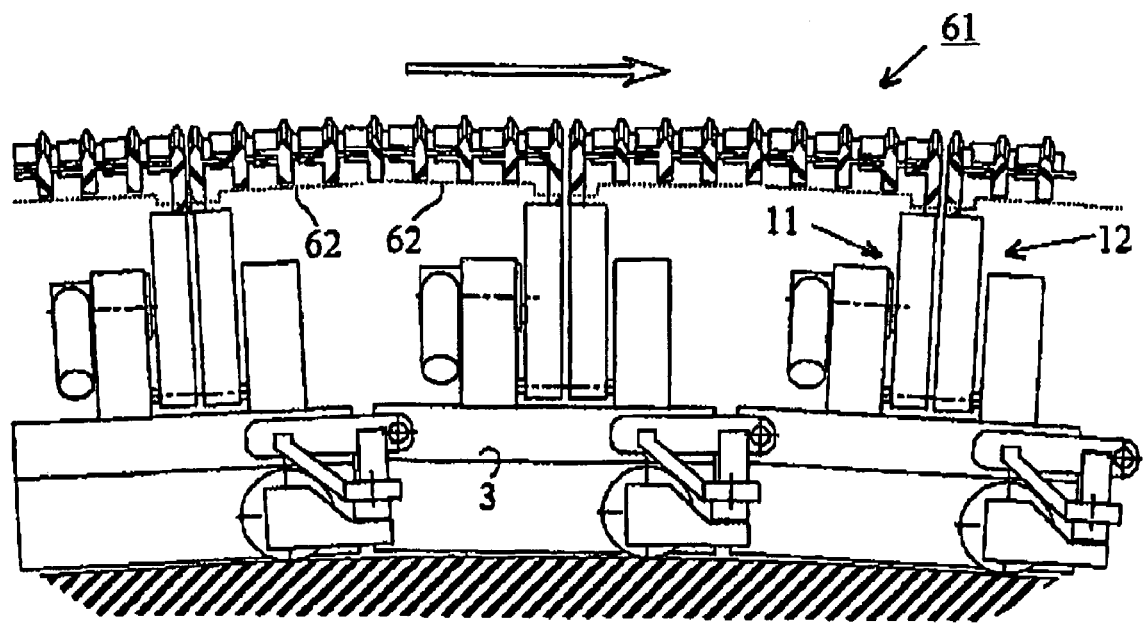
FIGS. 9a and 9b show the sorting device of FIG. 8 during passage of a convex bend and a concave (vertical) bend, respectively.
Figure 9B:
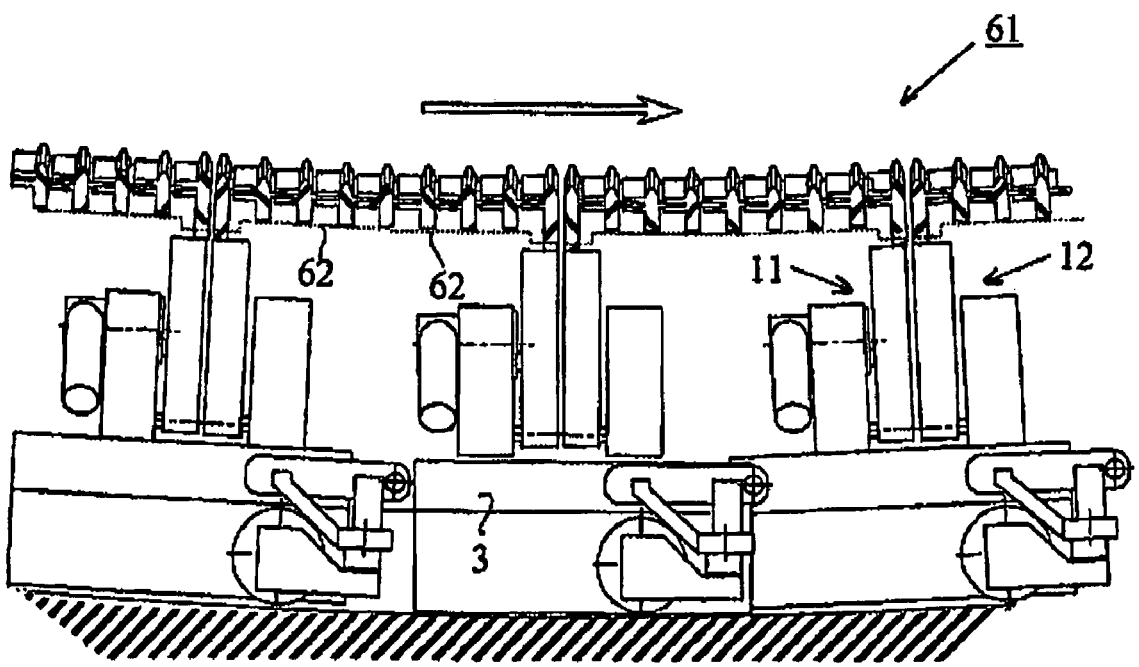

FIGS. 9*a* and 9*b* show the sorting device 61 of FIG. 8 during passage of a convex bend and a concave bend, respectively. The figures clearly show that the facing ends of the aligned rods 62 associated with a supporting platform 7 are spaced further apart in the convex bend that is shown in FIG. 9*a* than in the concave bend that is shown in FIG. 9*b*, in which said ends practically meet.

Figure 10:
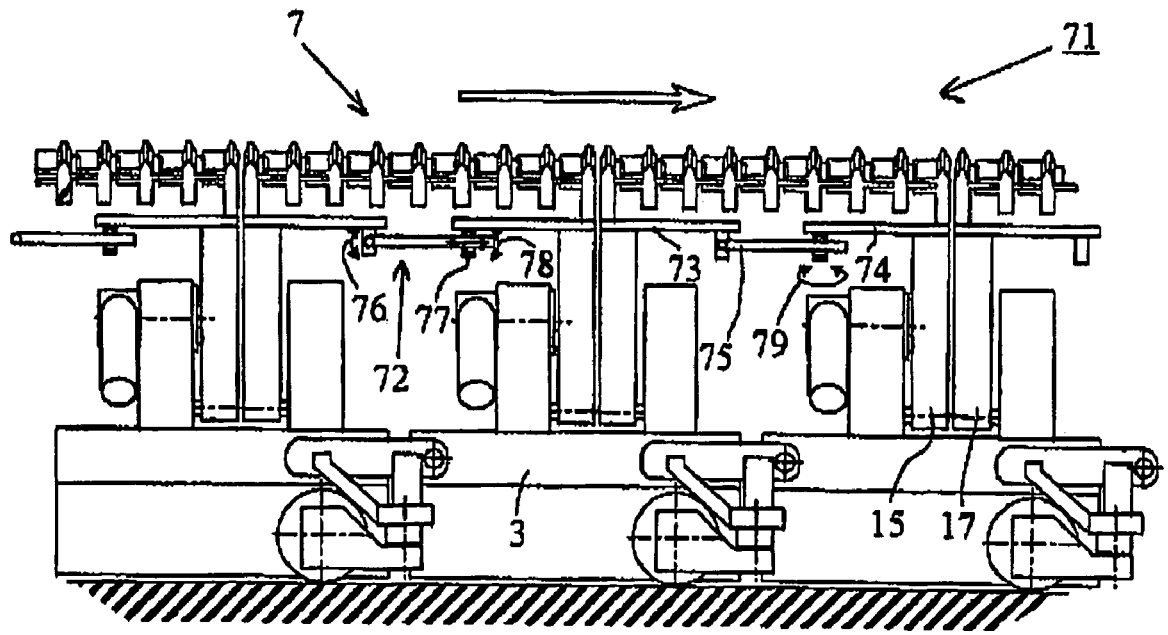
FIG. 10 is a schematic side elevation of a fourth variant of the sorting device.

FIG. 10 shows a sorting device 71 according to a fourth variant of the sorting device 1. Supplementary to the sorting device 1, the sorting device 71 comprises a connecting member 72 between the front tiltable supporting leg 15 and the rear tiltable supporting leg 17 associated with a specific supporting platform 7. As a result of the presence of said connecting member 72, which extends below the supporting platform 7, the tilting of the rear tiltable supporting leg 17 along with the front tiltable supporting leg 15 is not, or at least not only, effected through the transmission of forces via the slats 18, 19, 20 of the supporting platform 7 but via the connecting element 72. This leads to a decreased mechanical load on the slats 18, 19, 20 during tilting of the supporting platform 7 about the tilt axis 8.

The connecting element 72 comprises a rear connecting plate 73 and a front connecting plate 74, which are rigidly connected to, respectively, the rear tiltable supporting leg 17 and the front tiltable supporting leg 15. The connecting plates 73, 74 (also refer to FIGS. 14*a* and 14*b*) are interconnected by means of a connecting rod 75, which is connected to the rear connecting plate 73 at one end, as indicated by the arrow 76, and which is slidably and pivotally connected to the fixed connecting plate 74, as indicated by the arrows 77, 78 and 79, respectively. Thus, four degrees of freedom are present for the movement of the connecting plate 73, 74 relative to each other and, therefore, of the front tiltable supporting leg 15 and the rear tiltable supporting leg 17. Said degrees of freedom make it possible to pass horizontal as well as vertical bends in spite of the mechanical connection between the tiltable supporting legs 15, 17 for joint tilting thereof about the tilt axis 8 without the connecting element 72 being inactive. This means that in principle tilting can even take place while passing bends.

Figure 11A:
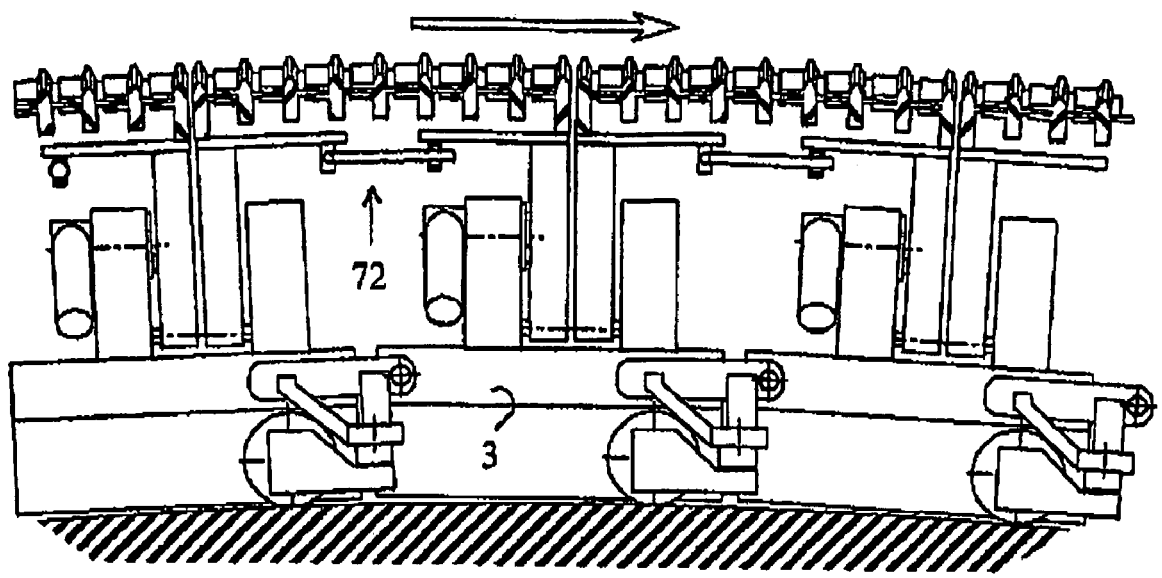
FIGS. 11a and 11b show the sorting device of FIG. 10 during passage of a convex bend and a concave (vertical) bend, respectively.
Figure 11B:
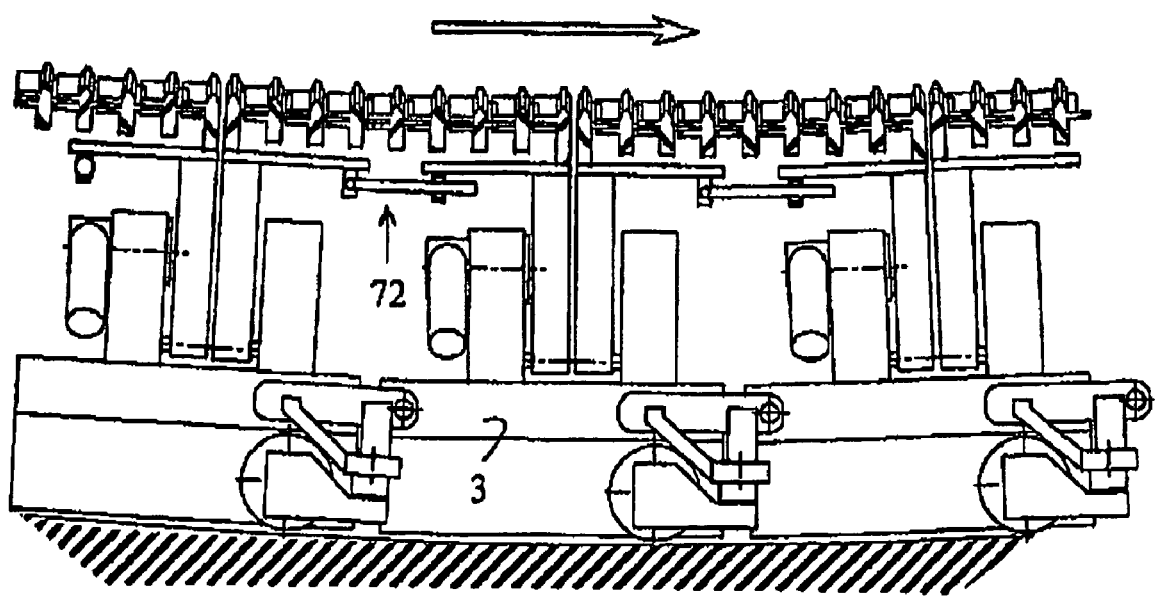

FIGS. 11*a* and 11*b* show the sorting device 71 during passage of a convex bend and a concave bend, respectively. It is apparent from said figures that three degrees of freedom are utilized, viz. the ones indicated by the arrows 76, 77 and 78.

Figure 12:
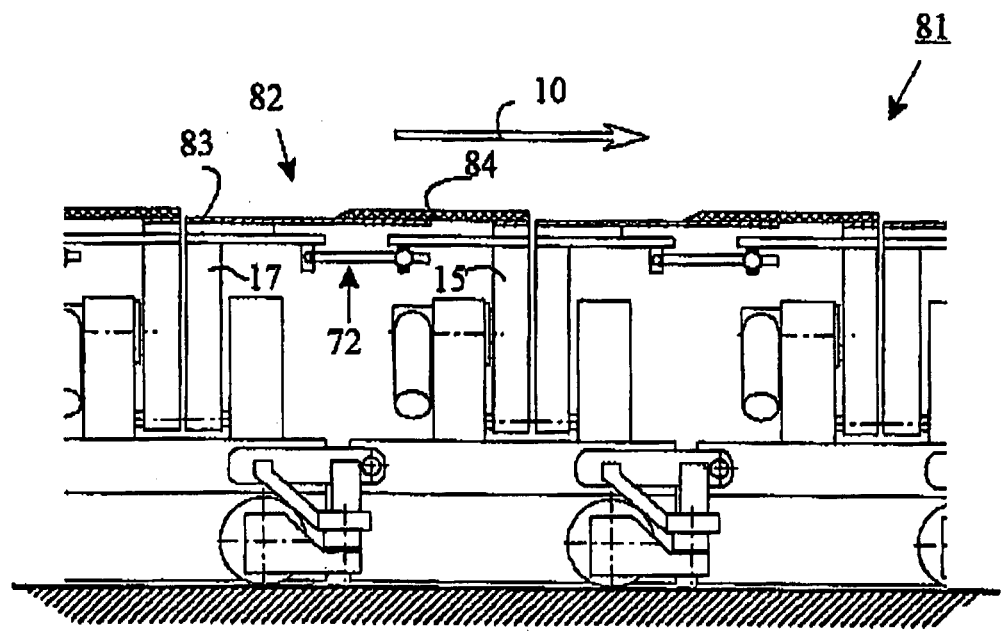
FIG. 12 is a schematic side view of a subvariant of the fourth variant of the sorting device of FIG. 10.

As appears from FIG. 12, which shows a sorting device 81 according to a subvariant, a connecting element 72 can also be suitably used if no intermediate supporting elements such as the intermediate slats 20 are present. In the sorting device 81, the supporting platform 82 thereof is made up of two partially overlapping supporting elements 83, 84, which are rigidly connected to the rear tiltable supporting leg 17 and the front tiltable supporting leg 15, respectively. The connecting element 72 that is used in the sorting device 81 is similar to the connecting element 72 that is used in the sorting device 71 according to FIGS. 10, 11*a* and 11*b*.

Figure 14A:
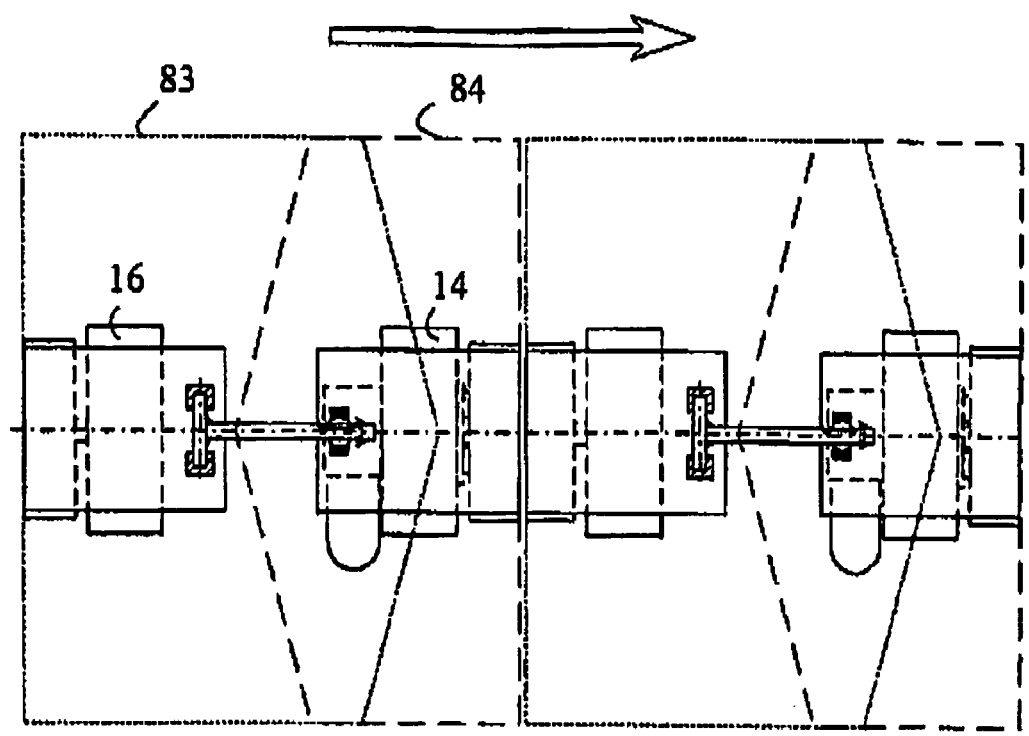
FIGS. 14a and 14b are schematic bottom views of the supporting platform of the sorting device of FIG. 2 during passage of a straight section of the conveying path and during passage of a horizontal bend, respectively.
Figure 14B:
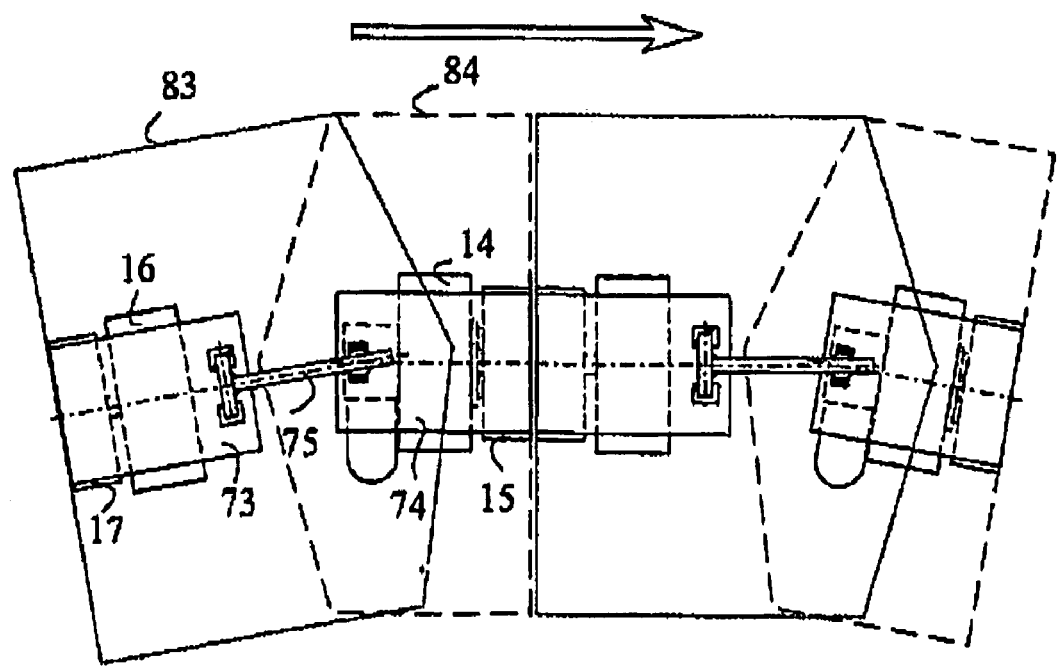

FIGS. 14*a* and 14*b* are bottom views of two adjacent supporting platforms 82 during passage of a straight section of the conveying path and of a horizontal bend in the conveying path, respectively. FIGS. 14*b* clearly shows the manner in which use is made of the degrees of freedom indicated by the arrows 77 and 79 (see FIG. 10) for passing a horizontal bend.

Figure 13A:
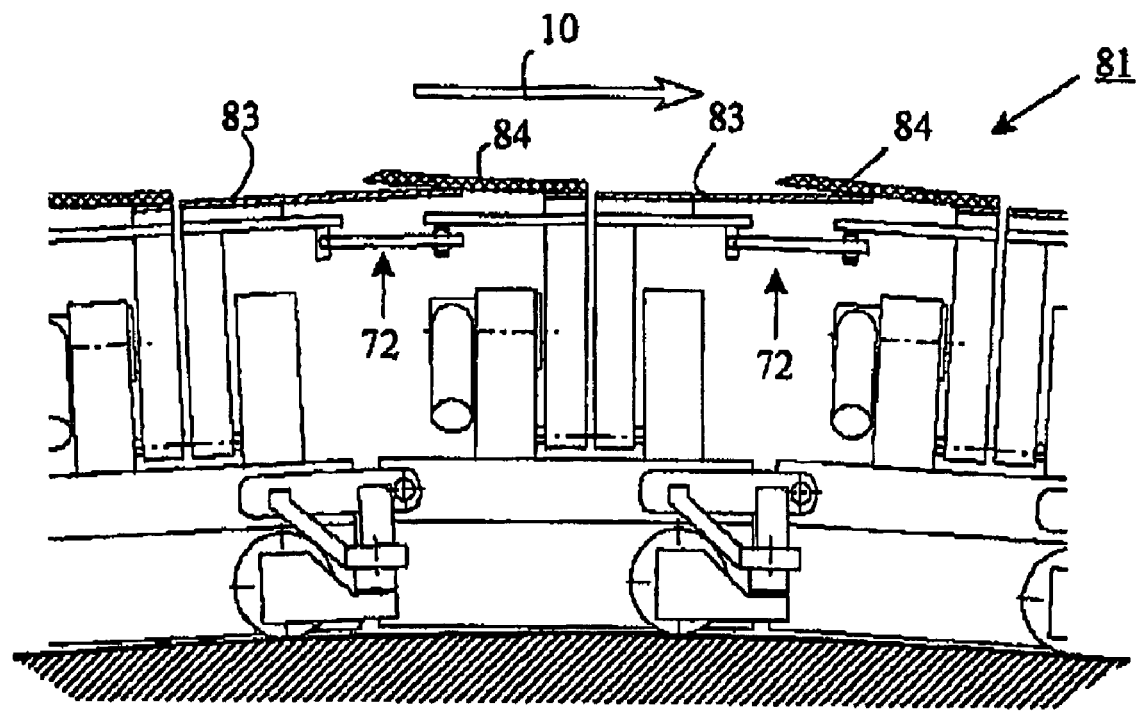
FIGS. 13a and 13b show the sorting device of FIG. 12 during passage of a convex bend and a concave (vertical) bend, respectively.
Figure 13B:
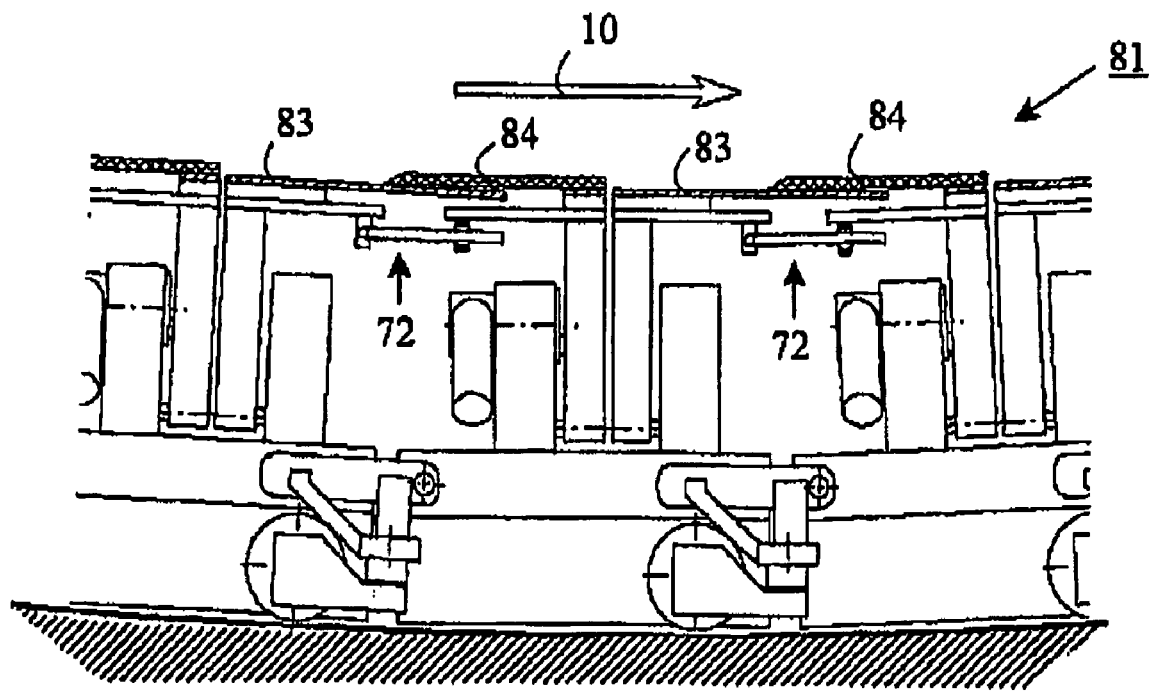

FIGS. 13*a* and 13*b* show the sorting device 81 during passage of a convex bend and a concave bend, respectively.

It will be apparent from said figures that it is advantageous if the supporting elements 83, 84 are elastically deformable to a limited extent.

Figure 15:
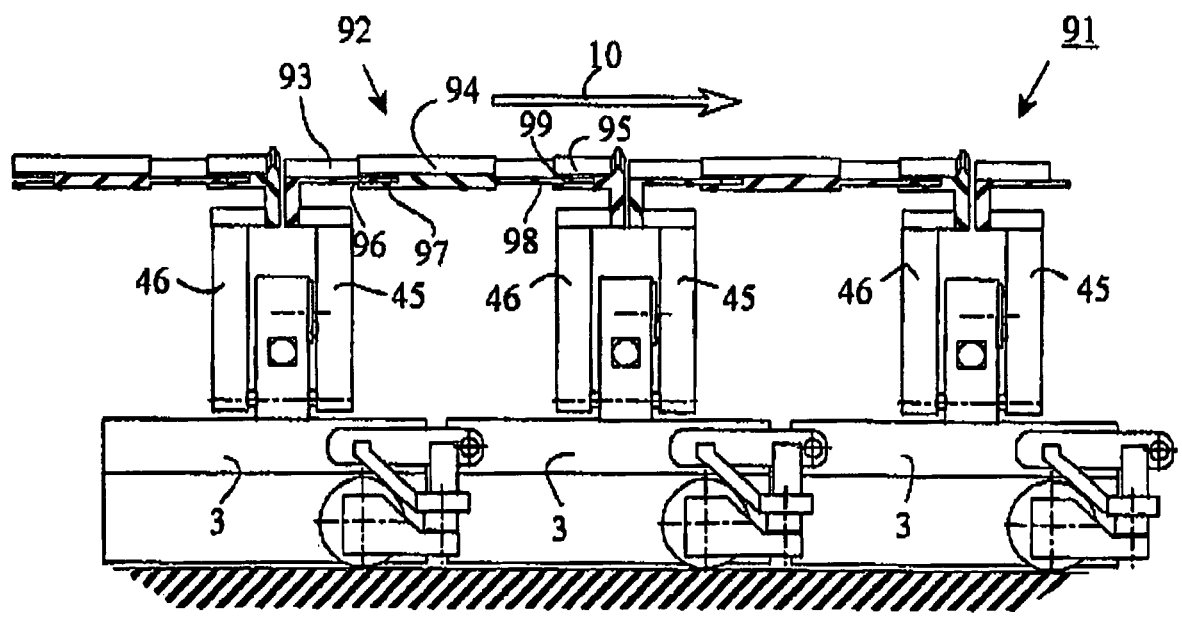
FIG. 15 is a schematic side view of a fifth variant of the sorting device.

FIG. 15 shows a sorting device 91. The sorting device 91 is most similar to the sorting device 41 that is shown in FIG. 6, with this understanding that a different supporting platform 92 is used, which supporting platform, moreover, is not additionally supported by a connecting element 48. Each supporting platform 92 comprises three supporting elements 93, 94, 95, with the middle supporting element 94 hanging between the outer supporting elements 93, 95, as it were, which are rigidly connected to the tiltable supporting legs 45, 46. The outer supporting element 93 has a forwardly projecting edge 96, which extends within the groove 97 in the intermediate supporting element 94. Said intermediate supporting element 94 likewise has a projecting edge 98 at its front side, which is accommodated in a groove 99 in the front supporting element 95.

Figure 16:
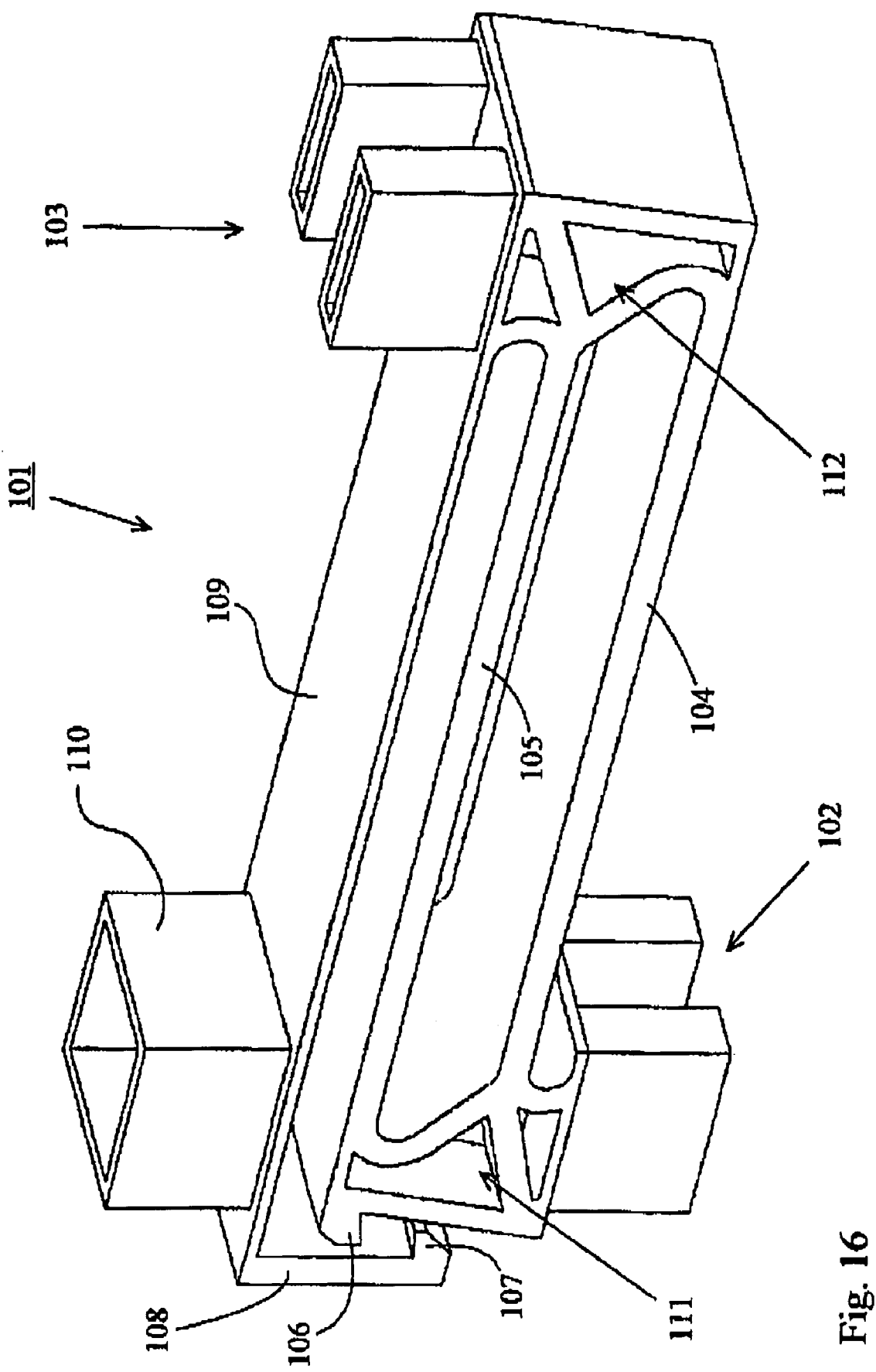
FIG. 16 is a perspective view of a spring stop element.

FIG. 16 shows a spring stop element 101 as can be used between adjacent slats in the middle of the length thereof, with the middle of the length of the slats on the one hand and the middle of the length of the spring stop element 101 on the other hand coinciding. In comparison with the orientation that is shown in FIG. 16, the spring stop element 101 will be rotated through 90 degrees about its longitudinal axis in mounted condition, its longitudinal direction extending parallel to the longitudinal direction of the slats, and thus perpendicularly to the direction of transport.

The spring stop element 101 is an injection-moulded product of plastic material, preferably glass fiber-filled nylon, which combines a favourable price with durability and advantageous stiffness properties.

The spring stop element 101 comprises two pairs of snap tongues 102, 103 positioned obliquely opposite each other, which extend in opposite directions into correspondingly shaped snap holes in (vertical parts of) two adjacent slats (not shown). Two parallel spring blades 104, 105 extend between said pairs of snap tongues 102, 103, parallel to the two slats. Unlike the spring blades 104, 105, the remaining part of the spring stop element 101 is not intended to deform during passage of horizontal or vertical bends of the supporting platform of which the slats form part, or at least not to the same extent as the spring blades 104, 105. Stiff tubular parts 111, 112 are present at the ends of the spring blades 104, 105.

On the side of the pair of snap tongues 102, the spring stop element 101 is provided with a pair of hooks 106, 107, which cannot pass each other. The hook 106 forms part of the spring stop element 101 in such a manner that it can be regarded as being rigidly connected to the pair of snap tongues 102. The hook 107 is mounted to the free end of a cross arm 108, which is in turn connected to the pair of snap tongues 103 via the relatively thin longitudinal arm 109. At the end opposite the pair of snap tongues 103, the longitudinal arm 109 is provided with a single snap block 110, which is in line with the pair of snap tongues 102 and which might alternatively be configured accordingly, i.e. with two snap tongues. In use, the snap block 110 is to be inserted into a snap hole of the slat into which the snap tongues 103 are inserted as well. In that case the longitudinal arm 109 only functions as a connecting element on which no substantial forces are exerted in use. In that sense the snap block 110 might be configured as a separate stop element together with the cross arm 108 provided with the hook 107. The embodiment that is shown in FIG. 17 is advantageous on account of the ease of assembly of the spring stop element 101, however.

During passage of a horizontal bend, the parallel spring leaves 104, 105 bend and either the hooks 106, 107 interlock (FIG. 17a), thus limiting the angular distortion between the slats in question between which the spring stop element 101 acts, or the tubular part 111 strikes against the longitudinal arm 109 near the snap block 110 (FIG. 17b), also limiting the angular distortion between the slats in question, albeit in the opposite direction in this case.

Figure 18:
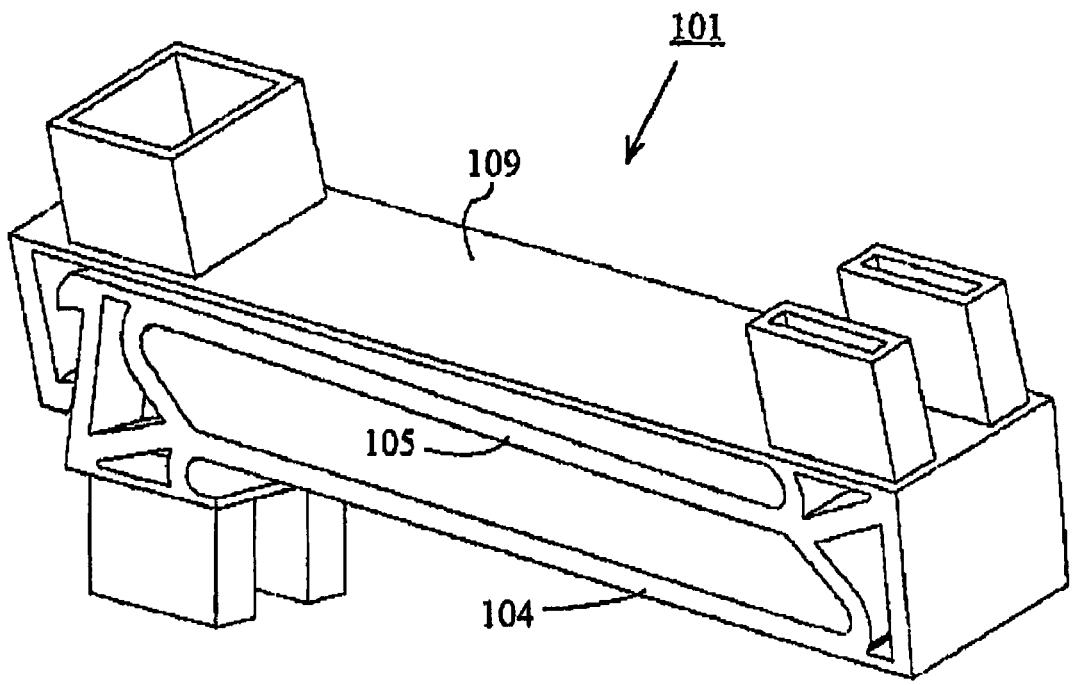
FIG. 18 shows the spring stop element of FIG. 16 as it is deformed during passage of a vertical bend.

During passage of a vertical bend, twisting of the parallel spring leaves 104, 105 takes place, as is shown in strongly exaggerated view in FIG. 18.

Figure 19:
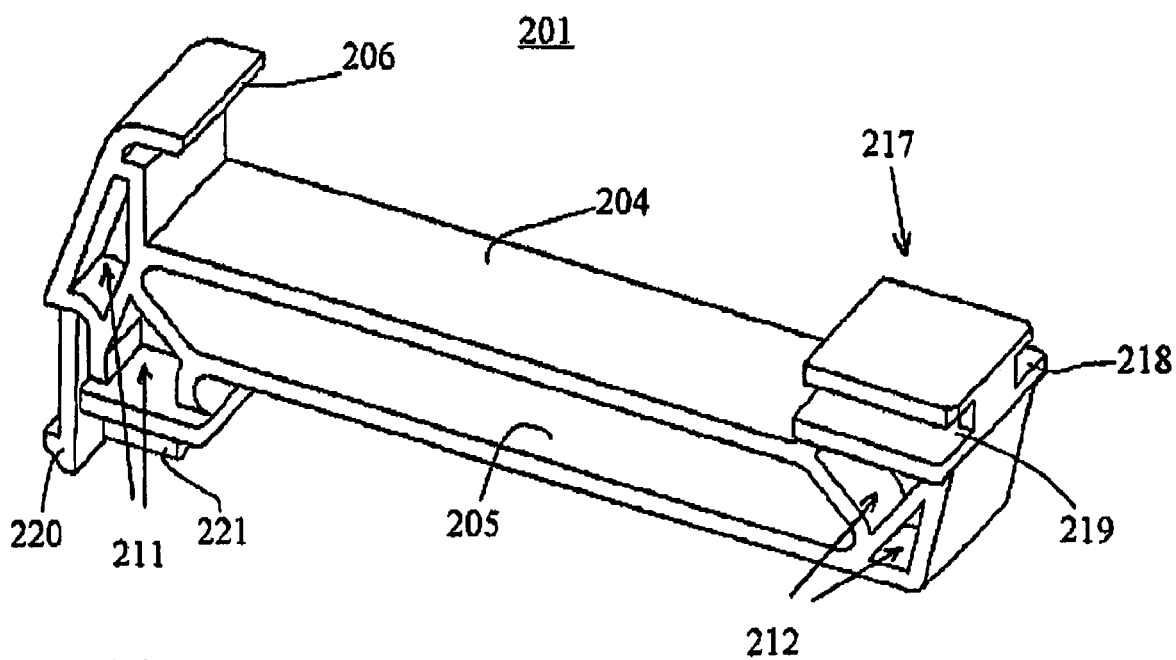
FIG. 19 is a perspective view of another spring stop element.
Figure 20:
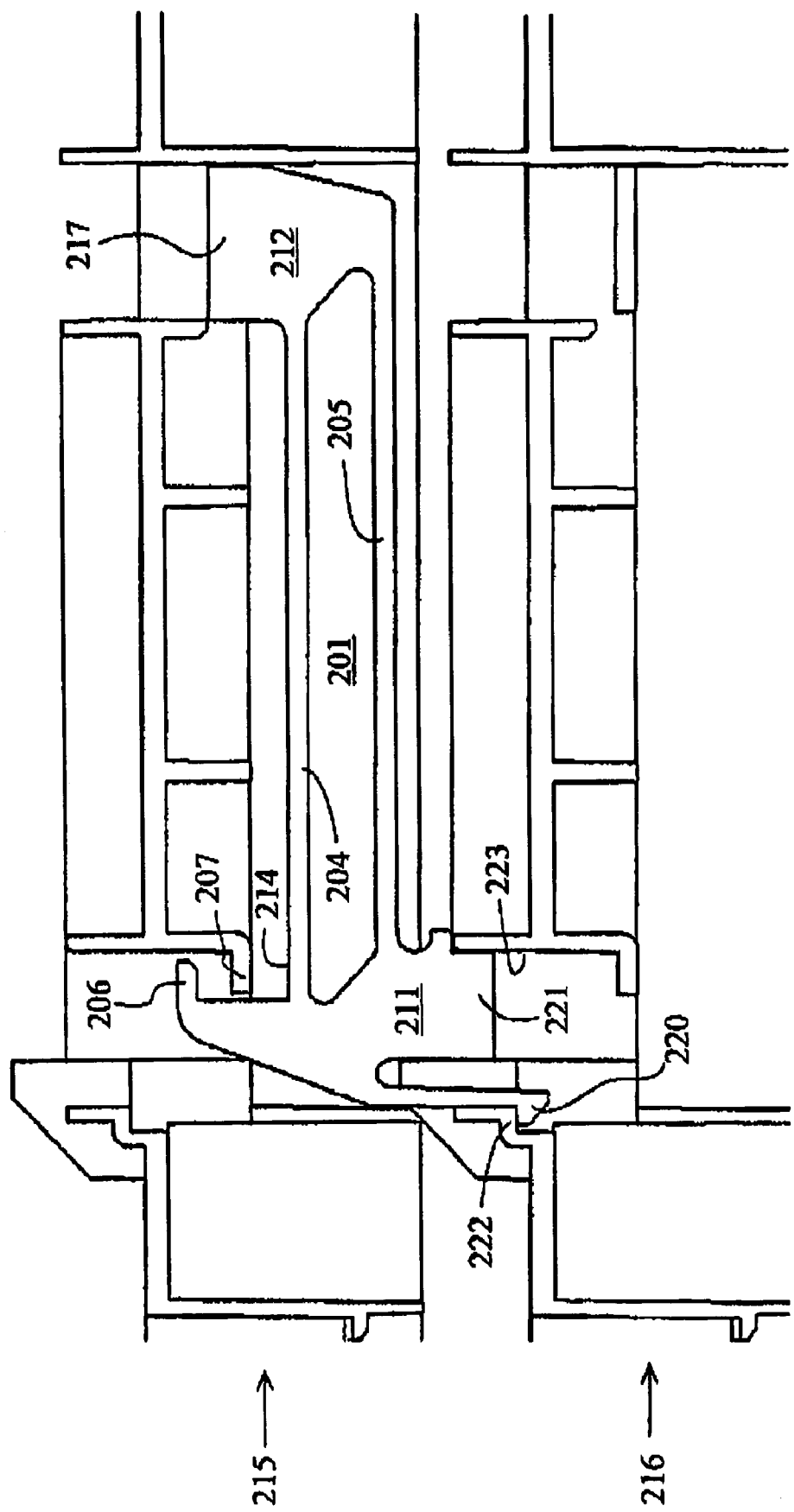
FIG. 20 is a schematic, horizontal cross-sectional view of the central part of two adjacent slats, with a spring stop element as shown in FIG. 19 present therebetween.

FIG. 19 shows another embodiment of a spring stop element 201, whilst FIG. 20 shows said spring stop element as used between two adjacent identical slats 215, 216. The spring stop element 201 is very similar to the spring stop element 101 of FIG. 16, in this sense that the spring stop element 201 also comprises two parallel spring leaves 204, 205, with rigid tubular parts 211, 212 at the ends thereof. The spring stop element 201 is in particular different from the spring stop element 101 as regards the manner in which the spring stop element 201 is mounted between and connected to the two slats 215, 216. To that end the spring stop element 201 is provided with a sliding block 217 provided with two sliding grooves 218, 219, which can be slid into correspondingly shaped sliding edges (not shown) extending in the longitudinal direction of the slat 215. The hook 206 of the spring stop element 201 is thereby positioned in the area in which it can mate with the hook 207 that is an integral, fixed part of the slat 215. Such mating occurs when the hooks 206, 207 are located on the side of the outside curve upon passage of a horizontal bend. When the hooks are located on the side of the inside curve upon passage of a horizontal bend, the angular distortion between the slats 215, 216 is limited in that the stop surface 214 that is formed by the upper side of the spring leaf 214 strikes against the hook 207.

The connection between the spring stop element 201 and the slat 216 is effected by means of the catch hook 220 and the stop block 221 of the spring stop element. 201, which hook behind the hook edge 221 and abut against the stop surface 223, respectively, that are integral with the slat 216.

Figure 17A:
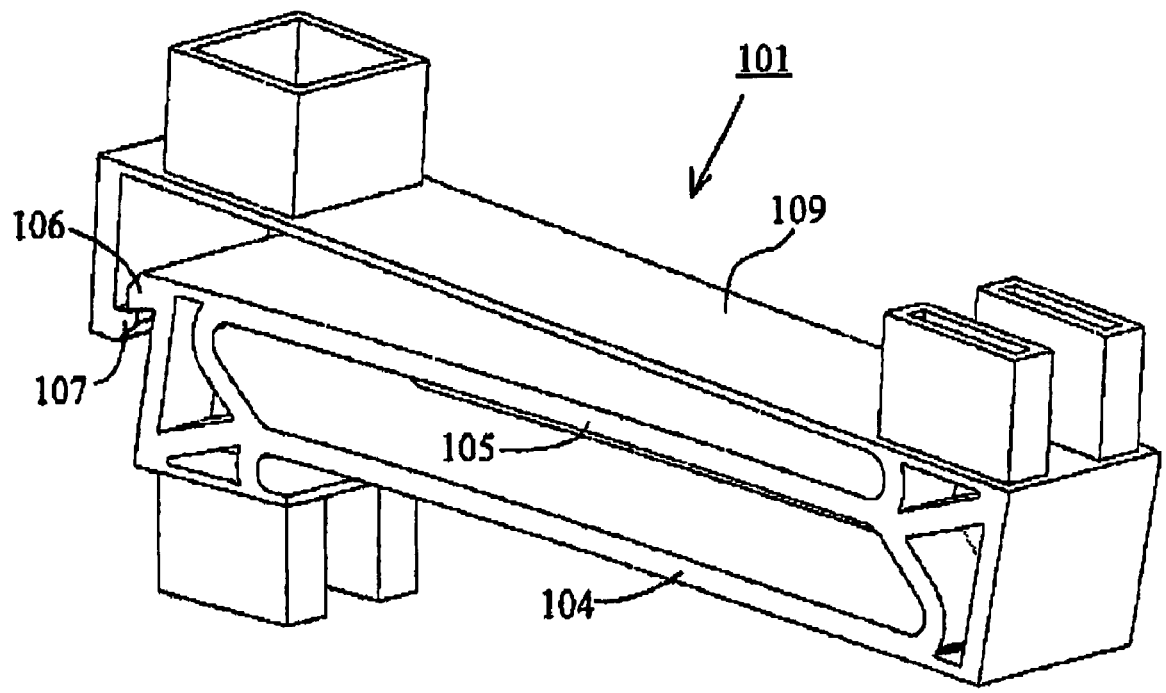
FIGS. 17a and 17b show the spring stop element of FIG. 16 as it is deformed during passage of a horizontal bend.
Figure 17B:
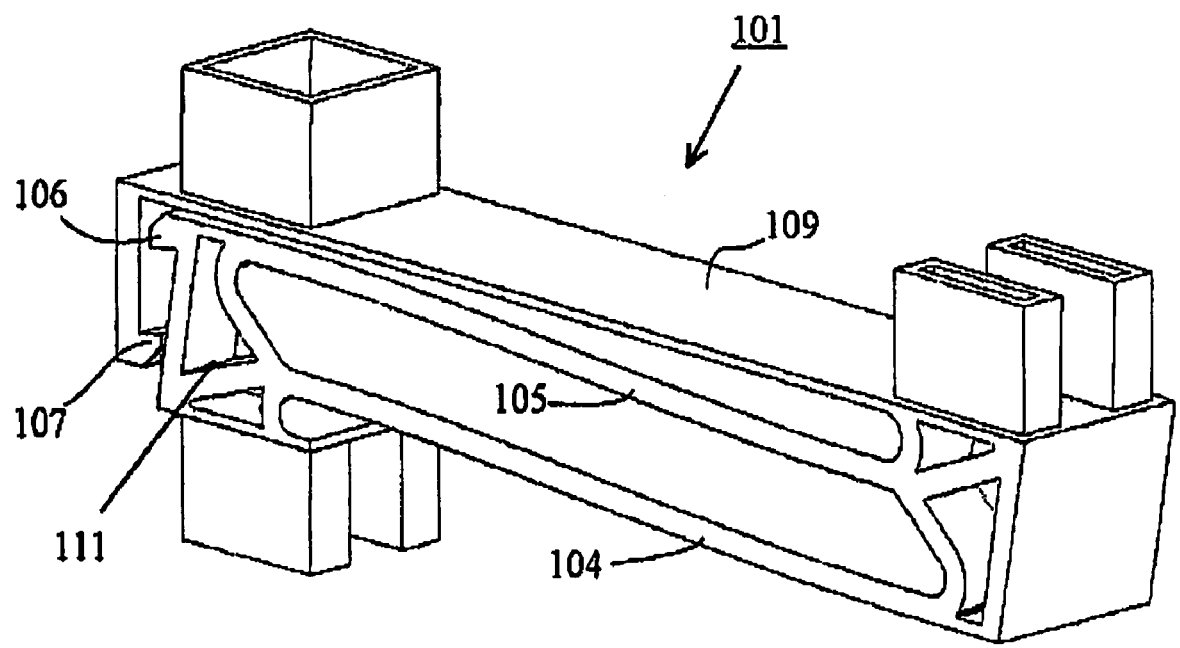

The deformations of the spring stop element 201 during passage of horizontal or vertical bends are absolutely comparable to the deformations of the spring stop element 101 as explained with reference to FIGS. 17a, 17b and 18.

Figure 21:
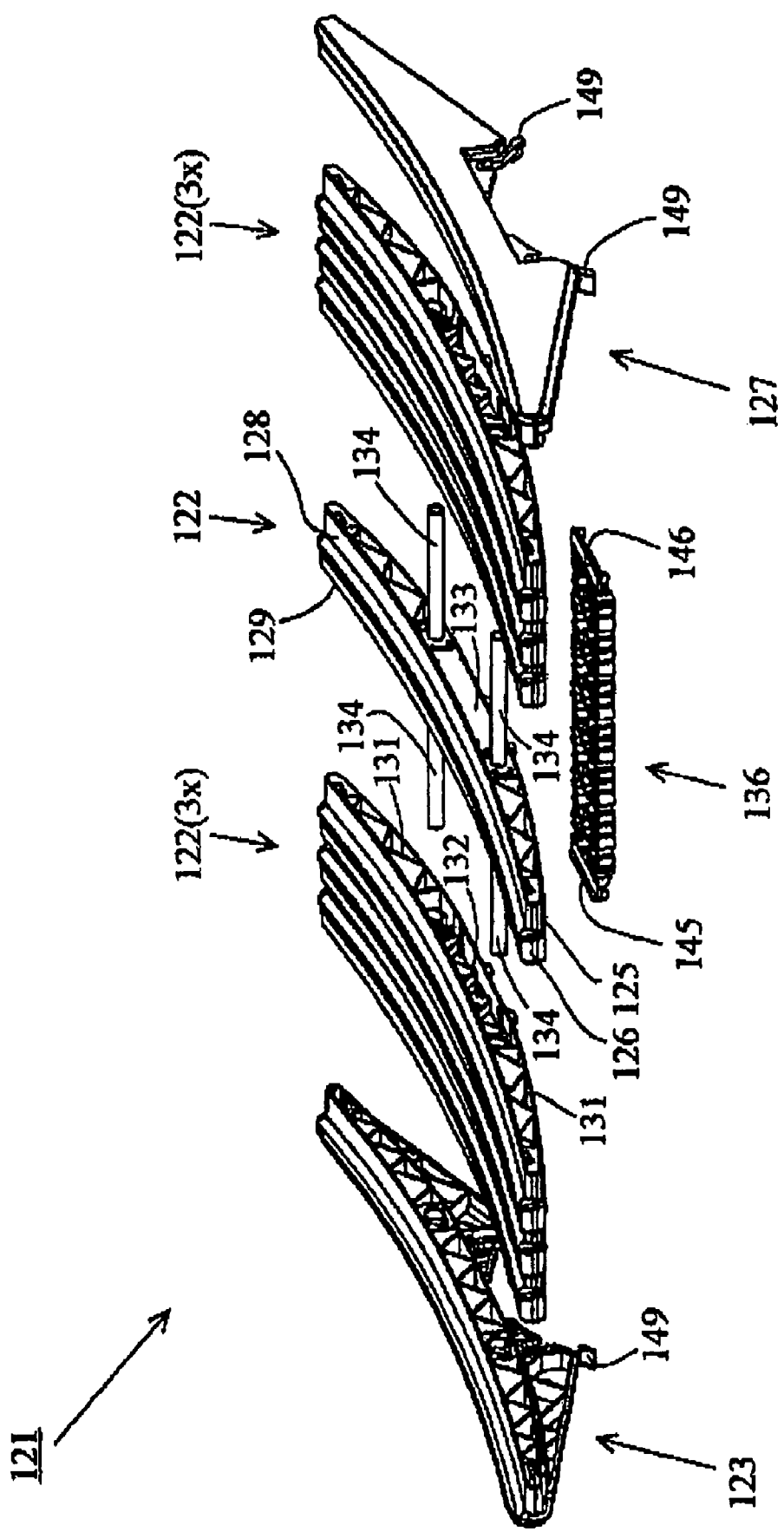
FIG. 21 is an exploded view of a supporting platform.
Figure 22:
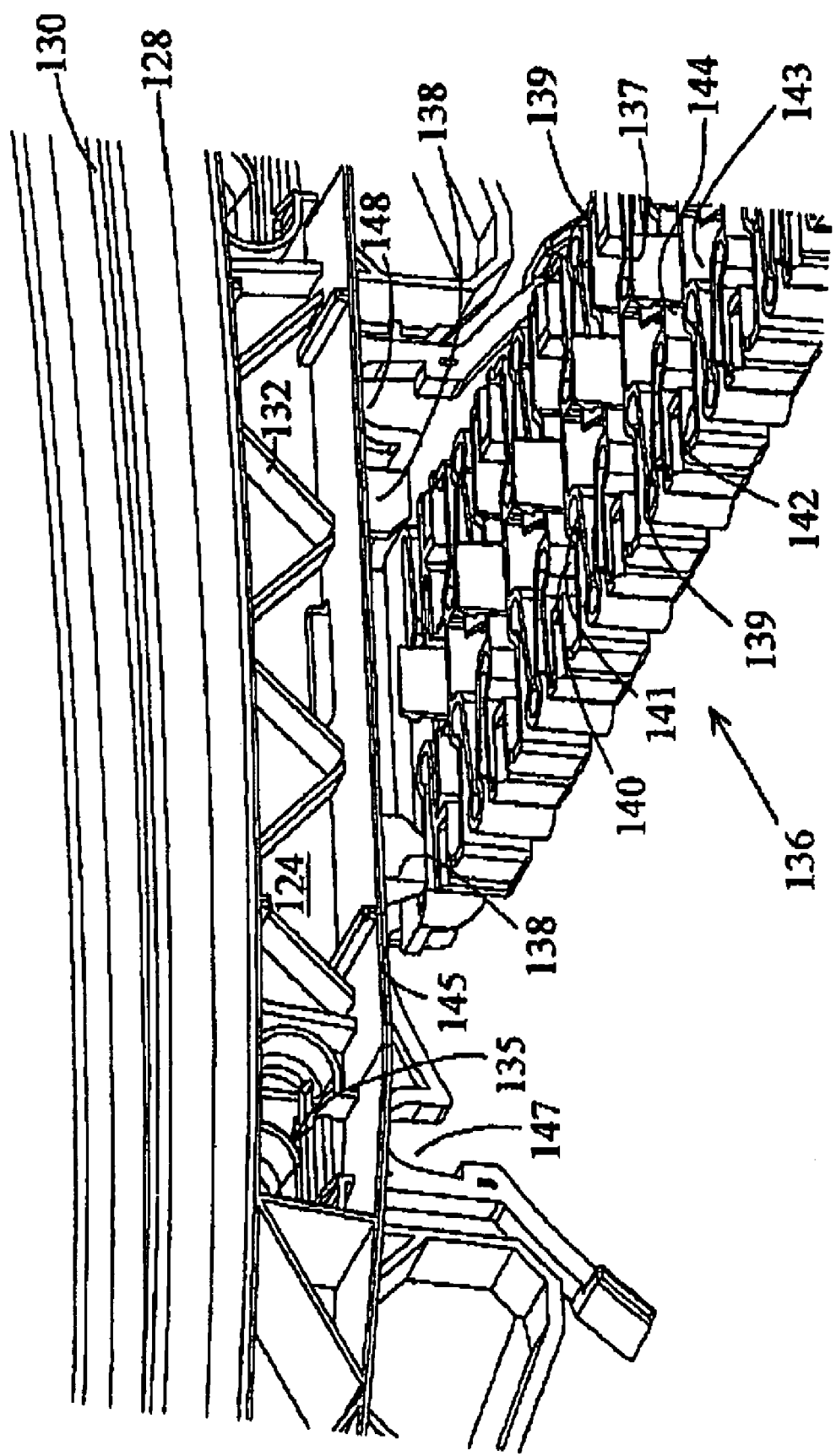
FIG. 22 is a perspective view of a multiple spring element and a slat forming part of the supporting platform of FIG. 21.

FIG. 21 is an exploded view of an alternative embodiment of a supporting platform 121. The supporting platform 121 comprises seven identical intermediate slats 122 and two outer slats 123, 127. Each intermediate slat 122 comprises an elongated vertical stiffening rib 124 (also refer to FIG. 22), on either side of which an elongated tubular part 125, 126 extends. The tubular part 125 has slightly smaller dimensions than the tubular part 126, which allow the tubular part 125 to extend within a tubular part 126 of an adjacent slat 122, 127.

The stiffening rib 124 extends to above the upper surfaces 128, 129 of the respective tubular parts 125, 126 and has a conical upper edge 130. Diagonal stiffening ribs 131, 132 are provided within the tubular part 125, the outer stiffening ribs 131 having a width that equals the width of the tubular part 125, whereas the middle stiffening ribs 132, which abut against the vertical rib 124, have a smaller width. As a result, space is available for accommodating an insert piece 133 within the tubular part 125 in the middle of the length thereof. Such an insert piece 133 is only provided near the middle intermediate slat 122 of the supporting platform 121.

Two pairs of carrying bars 134 extend from the insert piece 133. In the assembled position of the supporting platform 121, said carrying bars 134 extend through horizontally oriented slotted holes 135 in each slat 122, 123, 127, the carrying bars 134 having a length such that they extend to within the outer intermediate slats 122. The dimensions of the slotted holes 135 have been selected so that the carrying bars 134 extend within the slotted holes 135 with some play in the unloaded condition of the supporting platform 121, also during passage of horizontal and vertical bends. Said play is lost when a product of sufficient weight is supported by the supporting platform 121, in which case the carrying bars 134 come into contact with the circumferential edges of the respective the slotted holes 135, thus contributing to the support of the product in question. In this manner it is achieved that the supporting platform 122 as a whole is dimensionally stable to a sufficient degree, also when a relatively heavy product is present thereon.

The slats 122, 123, 127 are resiliently interconnected by an injection-molded spring element 136 of plastic material. The spring element 136 exhibits a repetitive pattern, seen in top plan view, whose pitch corresponds to the spacing between the intermediate slats 122. For each intermediate slat 122, the spring element 136 is provided with an upwardly extending snap hook 137, which can snap around an edge of an associated intermediate slat 122. In addition to that, each intermediate slat 122 is provided with two downwardly extending positioning lips 138, which fall within the corresponding positioning slots 139 of the spring element 136. Between adjacent positioning slots 139, the spring element 136 comprises two spring leaves 114, 141 arranged in the V-shape, on the ends of which spring eyes 142, 143, 144 are provided. The spring leaves 140, 141, in combination with the spring eyes 142, 143, 144, which, incidentally, are provided on either side of the snap hooks 137, ensure that the slats 122, 123, 127 of a supporting platform 121 will remain evenly spaced apart during passage of a horizontal or a vertical bend and will return to the neutral position in an even manner after having passed the bend in question.

The spring element 136 is at both ends provided with a clamping edge 145, 146 at the location of the outer slats 123, 127, which clamping edge is clamped between the outer slat 123, 127 in question and the associated supporting leg (not shown) to which the outer slats 123, 127 in question are snap-mounted via snap eyes 147, 148.

The assembly of the supporting platform 121 takes place in the following manner. First the insert piece 133 comprising the four carrying bars 134 is connected to the middle intermediate slat 122. Then the other intermediate slats 122 are slid over the carrying bars 134, after which the outer slats 123, 127 are in turn slid over the ends of the carrying bars 134. The assembly thus formed is turned upside down, after which the spring element 136 is in turn snap-mounted to the outer slats 123, 127, thus forming a manageable unit. To detach the supporting platform 121 from the supporting legs again, if desired, the snap eyes 147, 148 can be enlarged by moving the engaging parts 149 outwards, so that the supporting legs can be disconnected.

The use of the carrying bars 134, which are rigidly connected to the intermediate slat 122, also enables an alternative embodiment of the supporting platform 121, viz, the one in which the final support of the supporting platform on the associated bogie(s) does not take place via two supporting legs for the outer slats 122, 127, but rather via a single supporting leg for the middle intermediate slat 122. It will generally be advantageous in this regard to provide the middle intermediate slat 122 with means that make it possible to realize a solid connection with the single supporting leg, whilst on the other hand the outer slats 123, 127 can be configured without such means in that case.

The invention claimed is:

1. A device for sorting products, comprising:
   a plurality of bogies which are movable in a direction of transport along a conveying path, which bogies are pivotally interconnected,
   supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, which supporting elements comprise two outer supporting elements which, as seen in the direction of transport, are located exclusively at a front side and rear side, respectively, of each of the supporting platforms and at least one intermediate supporting element positioned between said outer supporting elements,
   a supporting device for supporting the supporting platforms on the bogies, and
   tilting means for tilting the supporting platforms about a tilt axis that extends parallel to the direction of transport, wherein support of at least one intermediate supporting element on the bogies takes place exclusively via adjacent outer supporting elements thereof.

2. A device according to claim 1, wherein adjacent supporting elements are at facing sides thereof provided with a groove and with an edge extending into the groove of the adjacent supporting element, respectively, for retaining the adjacent supporting elements with respect to each other in the direction perpendicular to the supporting surface.

3. A device according to claim 2, wherein said groove is formed by at least an upper groove edge, whose upper side forms part of the supporting surface.

4. A device according to claim 1, wherein each of the supporting elements of a supporting platform can only tilt in unison about the tilt axis.

5. A device according to claim 1, wherein the outer supporting elements are made up of outer slats.

6. A device according to claim 1, wherein the intermediate supporting elements are made up of intermediate slats.

7. A device according to claim 6, wherein each intermediate slat has two horizontal flat sections, which overlap horizontal flat sections of adjacent slats on the two longitudinal sides of the intermediate slats, with the upper side of at least one part of the horizontal flat sections forming part of the supporting surface.

8. A device according to claim 6, wherein intermediate slats are provided between the outer slats.

9. A device according to claim 6, wherein the length and the breadth of the intermediate slats are in a ratio of at least four to one.

10. A device according to claim 6, wherein the center-to-center distance between adjacent slats ranges between 30 mm and 80 mm.

11. A device according to claim 6, wherein the width of the slats is a maximum of 200 mm.

12. A device according to claim 1, wherein the number of intermediate supporting elements is at least two.

13. A device according to claim 1, wherein at least each intermediate supporting element is provided with a vertically oriented stiffening rib.

14. A device according to claim 13, wherein said stiffening rib extends below a horizontal flat section of the associated intermediate supporting element.

15. A device according to claim 13, wherein the stiffening rib extends above a horizontal flat section of the associated intermediate supporting element.

16. A device according to claim 15, wherein the stiffening rib has a tapered upper edge.

17. A device according to claim 1, wherein each supporting platform comprises spring means that are operative between adjacent supporting elements.

18. A device according to claim 17, wherein the spring means comprise leaf elements oriented perpendicularly to the supporting surface.

19. A device according to claim 18, wherein at least two leaf elements are provided between two adjacent supporting elements, said leaf elements being interconnected at one end and which act on the two adjacent supporting elements via the opposite ends.

20. A device according to claim 18, wherein said leaf elements comprise leaf spring elements.

21. A device according to claim 19, wherein the two leaf elements are pivotally interconnected.

22. A device according to claim 21, wherein the spring means comprise a torsion spring at the location of the pivoted joint, which torsion spring functions to resist pivoting movement of the two leaf elements with respect to each other from a neutral position.

23. A device according to claim 17, wherein said spring means act on at least one stiffening rib.

24. A device according to claim 17, wherein the spring means comprise an elastically deformable spring member, to which at least three supporting elements are attached.

25. A device according to claim 24, wherein each of supporting elements of the associated supporting platform are attached to the spring member.

26. A device according to claim 24, wherein the spring member comprises a regular pattern having a pitch which corresponds to the spacing between adjacent supporting elements.

27. A device according to claim 17, wherein the spring means are connected to supporting elements via snap connections.

28. A device according to claim 1, wherein each supporting platform comprises stop means for limiting the movement that two adjacent supporting elements can make relative to each other.

29. A device according to claim 28, wherein each intermediate supporting element is provided with a stiffening rib and the stiffening rib forms part of a stop means.

30. A device according to claim 28, wherein said stop means comprise hook members.

31. A device according to claim 30, wherein said hook members act in a plane parallel to the supporting surface.

32. A device according to claim 1, wherein the supporting device comprise at least one supporting leg for each supporting platform.

33. A device according to claim 32, wherein said supporting body is rigidly connected to at least one supporting leg.

34. A device according to claim 32, wherein the supporting means device comprise two supporting legs for supporting the outer supporting elements of the supporting platforms.

35. A device according to claim 34, wherein the two supporting legs are rigidly connected to the outer supporting elements of the supporting platforms.

36. A device according to claim 34, wherein the supporting legs are jointly tiltable about the tilt axis with the associated supporting platforms as a result of the action of the tilting means.

37. A device according to claim 36, wherein the supporting device comprise fixed legs, which are fixedly connected to a bogie and to which the supporting legs are tiltably about the tilt axis connected.

38. A device according to claim 37, wherein two of the supporting legs lie side by side of adjacent supporting platforms and are tiltably connected to one and the fixed legs.

39. A device according to claim 36, which comprises connecting means provided for mechanically connecting the supporting legs of a supporting platform parallel to the supporting surface.

40. A device according to claim 39, wherein said connecting means are arranged for moving the supporting legs in at least two degrees of freedom with respect to each other.

41. A device according to claim 40, wherein said connecting means are arranged for moving the supporting legs in at least three degrees of freedom with respect to each other.

42. A device according to any claim 34, wherein the two supporting legs associated with a supporting platform are supported on two different bogies.

43. A device according to claim 34, wherein at least two supporting bodies are provided for each supporting platform, which supporting bodies are each rigidly connected to one of the two supporting legs.

44. A device according to claim 43, wherein at least four supporting bodies are provided for each supporting platform, which supporting bodies are each rigidly connected to one of the two supporting legs.

45. A device according to claim 43, wherein the supporting bodies have free ends that face towards each other.

46. A device according to claim 1, wherein the supporting device support the supporting platforms via the outer supporting elements.

47. A device according to claim 1, wherein the tilting means cause the supporting platforms to tilt via one of the outer supporting elements.

48. A device according to claim 1, wherein said supporting device comprise at least one supporting body extending along adjacent intermediate supporting elements for each supporting platform, which functions to support the adjacent intermediate supporting elements.

49. A device according to claim 48, wherein the supporting body extends under adjacent intermediate supporting elements.

50. A device according to claim 48, wherein the supporting body extends through holes in the adjacent supporting elements.

51. A device according to claim 50, wherein the dimensions of the holes in the direction parallel to the supporting surface and perpendicular to the direction of movement are larger than the dimensions of the holes in the direction perpendicular to the supporting surface.

52. A device according to claim 48, a degree of play exists between the supporting body and the adjacent supporting elements in the unloaded, neutral condition of the associated supporting platform.

53. A device according to claim 48, a degree of play exists between the supporting body and at least part of the adjacent supporting elements in the unloaded, non-neutral position of the associated supporting platform.

54. A device according to claim 48, wherein said at least one supporting body extends parallel to the direction of transport from an outer supporting element.

55. A device according to claim 48, wherein said at least one supporting body is rigidly connected to one intermediate supporting element.

56. A device according to claim 55, wherein said at least one supporting body is rigidly connected to an intermediate supporting element that is positioned in the center of the associated supporting platform, as seen in a direction of transport.

57. A device according to claim 55, wherein said at least one supporting body extends on either side of the intermediate supporting element to which it is rigidly connected.

58. A device according to claim 1, wherein the outer supporting elements at the front side and the rear side of the associated supporting platform are provided with guard surfaces oriented perpendicularly to the supporting surface and extending below the level of the supporting surface.

59. A device according to claim 1, wherein the bogies are provided with driving means for placing the tilting means in an operative position thereof.

60. A device according to claim 59, wherein said driving means comprises an electric motor for each bogie.

61. A device for sorting products, comprising:
a plurality of bogies which are movable in a direction of transport along a conveying path, which bogies are pivotally interconnected,
supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, which supporting elements comprise two outer supporting elements which, as seen in the direction of transport, are located at a front side and rear side, respectively, of each of the supporting platforms and at least one intermediate supporting element positioned between said outer supporting elements,
a supporting device for supporting the supporting platforms on the bogies, and
tilting means for tilting the supporting platforms about a tilt axis that extends parallel to the direction of transport, wherein support of said at least one intermediate supporting element on the bogies takes place via the outer supporting elements,
wherein each supporting platform comprises spring means that are operative between adjacent supporting elements, and
wherein the stiffness of the spring means is lower in the direction of transport than in the direction perpendicular to the supporting surface.

62. A device for sorting products, comprising:
a plurality of bogies which are movable in a direction of transport along a conveying path, which bogies are pivotally interconnected,
supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, which supporting elements comprise two outer supporting elements which, as seen in the direction of transport, are located at a front side and rear side, respectively, of each of the supporting platforms and at least one intermediate supporting element positioned between said outer supporting elements, supporting device for supporting the supporting platforms on the bogies, and tilting means for tilting the supporting platforms about a tilt axis that extends parallel to the direction of transport, wherein support of said at least one intermediate supporting element on the bogies takes place via the outer supporting elements, wherein the supporting device comprise at least one supporting leg for each of said supporting device and comprise two supporting legs for supporting the outer supporting elements of the supporting platforms, at least two supporting bodies are provided for each supporting platform, which supporting bodies are each rigidly connected to one of the supporting legs, and wherein the supporting bodies partially overlap, as seen a direction of transport.

63. A device for sorting products, comprising bogies which are movable in a direction of transport along a conveying path, said bogies being pivotally interconnected, supporting platforms comprising a supporting surface for supporting products to be sorted, each of said supporting platforms comprising supporting elements which are movable with respect to an adjacent supporting element for changing the circumference of the supporting platform in question during passage of a bend in the conveying path, said supporting elements each having two outer supporting elements which, as seen in a direction of transport, are located exclusively at the front side and the rear side, respectively, of the supporting platform in question and at least one intermediate supporting element positioned between said outer supporting elements and supported exclusively by said outer supporting elements, supporting means for supporting the supporting platforms on the bogies, and tilting means for tilting the supporting platforms about a tilt axis that extends parallel to the direction of transport, wherein the supporting means comprise at least one supporting body for each supporting platform, which is rigidly connected to one intermediate supporting element and which extends on either side of the intermediate supporting element in question, along the adjacent supporting elements of the supporting platform for supporting the adjacent supporting elements, and wherein support of the supporting platform on a bogie occurs via the intermediate supporting element.

* * * * *